(12) United States Patent
Okada et al.

(10) Patent No.: US 11,214,746 B2
(45) Date of Patent: Jan. 4, 2022

(54) POWER GENERATION SYSTEM

(71) Applicant: Renaissance Energy Research Corporation, Kyoto (JP)

(72) Inventors: Osamu Okada, Kyoto (JP); Nobuaki Hanai, Kyoto (JP); Junya Miyata, Kyoto (JP); Hideaki Matsuo, Kyoto (JP)

(73) Assignee: RENAISSANCE ENERGY RESEARCH CORPORATION, Kyoto (JP)

( * ) Notice: Subject to any disclaimer, the term of this patent is extended or adjusted under 35 U.S.C. 154(b) by 112 days.

(21) Appl. No.: 16/642,003

(22) PCT Filed: Aug. 16, 2018

(86) PCT No.: PCT/JP2018/030448
§ 371 (c)(1),
(2) Date: Feb. 25, 2020

(87) PCT Pub. No.: WO2019/049629
PCT Pub. Date: Mar. 14, 2019

(65) Prior Publication Data
US 2020/0239797 A1 Jul. 30, 2020

(30) Foreign Application Priority Data
Sep. 7, 2017 (JP) .............................. JP2017-171866

(51) Int. Cl.
*C10L 3/10* (2006.01)
*C10L 3/08* (2006.01)
(Continued)

(52) U.S. Cl.
CPC ................ *C10L 3/10* (2013.01); *B01D 53/22* (2013.01); *B01D 53/229* (2013.01); *B01D 69/00* (2013.01);
(Continued)

(58) Field of Classification Search
CPC ........... C10L 3/10; B01D 69/00; B01D 53/22; F02D 19/02; F02M 21/02; F02B 43/10
See application file for complete search history.

(56) References Cited

U.S. PATENT DOCUMENTS 6,601,543 B2 * 8/2003 Rautenbach ............ F02B 43/00
123/3
7,363,883 B2 * 4/2008 Ito ...................... F02M 21/0278
123/3
(Continued)

FOREIGN PATENT DOCUMENTS

AU      2003268761 A1    1/2005
CN         1788146 A     6/2006
(Continued)

OTHER PUBLICATIONS

EP 18853791—Extended European Search Report dated Apr. 23, 2021, 8 pgs.

*Primary Examiner* — John Kwon
*Assistant Examiner* — Johnny H Hoang
(74) *Attorney, Agent, or Firm* — Andrew L. Dunlap; Haynes Beffel & Wolfeld LLP

(57) ABSTRACT

A power generation system comprises a fuel gas supply device 13 for controlling methane concentration or carbon dioxide concentration in a mixed gas MG containing methane and carbon dioxide within a setting range for the concentration in the fuel gas of a gas engine 11, and for supplying the mixed gas MG to the gas engine 11 as the fuel gas, and a gas concentration sensor 14 for measuring the carbon dioxide concentration or the methane concentration of the mixed gas MG. The fuel gas supply device 13 comprises a carbon dioxide removal device 16 for removing carbon dioxide in the mixed gas MG, and an operating condition control device 17 for controlling an operating condition that affects an increase or decrease of a carbon (Continued)

dioxide removal rate of the carbon dioxide removal device 16, and the operating condition control device 17 controls the operating condition of the carbon dioxide removal device 16 based on the measurement result of the gas concentration sensor 14, thereby controlling the concentration of methane and carbon dioxide in the mixed gas.

20 Claims, 18 Drawing Sheets

(51) Int. Cl.
*F02M 21/02* (2006.01)
*B01D 53/22* (2006.01)
*B01D 69/00* (2006.01)
*F02B 43/10* (2006.01)
*F02D 19/02* (2006.01)
*F02D 29/06* (2006.01)
*H01M 8/06* (2016.01)

(52) U.S. Cl.
CPC .............. *F02B 43/10* (2013.01); *F02D 19/02* (2013.01); *F02D 29/06* (2013.01); *F02M 21/02* (2013.01); *H01M 8/06* (2013.01)

(56) References Cited

U.S. PATENT DOCUMENTS

| | | | |
|---|---|---|---|
| 8,671,870 | B2 | 3/2014 | McAlister |
| 2007/0022733 | A1 | 2/2007 | Sako et al. |
| 2007/0141417 | A1* | 6/2007 | Bitoh .................. H01M 8/0491 429/423 |
| 2007/0282021 | A1* | 12/2007 | Campbell .................. C10J 3/82 518/726 |
| 2010/0325958 | A1* | 12/2010 | Molaison ................ C10K 1/00 48/128 |
| 2011/0036237 | A1 | 2/2011 | Okada et al. |
| 2014/0044632 | A1* | 2/2014 | Zielinski ................ B01D 53/62 423/230 |
| 2014/0352540 | A1 | 12/2014 | Okada et al. |

FOREIGN PATENT DOCUMENTS

| | | |
|---|---|---|
| EP | 0116531 A1 | 8/1984 |
| EP | 1643099 A1 | 4/2006 |
| EP | 2239048 A1 | 10/2010 |
| JP | 2002275482 A | 9/2002 |
| JP | 2005002950 A | 1/2005 |
| JP | 2008036463 A | 2/2008 |
| JP | 2008255209 A | 10/2008 |
| JP | 2010209706 A | 9/2010 |
| JP | 4621295 B2 | 1/2011 |
| JP | 2013022581 A | 2/2013 |
| JP | 2013049048 A | 3/2013 |
| RU | 2006101153 A | 5/2006 |
| UA | 78460 C2 | 3/2007 |
| WO | 2004111412 A1 | 12/2004 |
| WO | 2013010195 A1 | 1/2013 |

\* cited by examiner

| Item | Unit | Supply gas flow rate Ff | Supply side pressure Pf | Permeation side pressure Ps | Sweep gas flow rate Fs | Ambient temperature Ta | Membrane area Sm |
|---|---|---|---|---|---|---|---|
| Membrane area Sm | m² | 90 | 90 | 90 | 90 | 90 | Variable |
| Ambient temperature Ta | °C | 60 | 60 | 60 | 60 | Variable (60, 90) | 90 |
| Supply side pressure Pf | kPaA | 500 | Variable | 700 | 600 | 600 | 600 |
| Supply gas flow rate Ff (dry base) | Nm³/h | Variable | 50 | 50 | 50 | 50 | 50 |
| Humidities of mixed gas | %RH | 70 | 70 | 70 | 70 | 70 | 70 |
| Composition ratio of mixed gas (dry base) CO₂ | | 0.4 | 0.4 | 0.4 | 0.4 | 0.4 | 0.4 |
| Composition ratio of mixed gas (dry base) CH₄ | | 0.6 | 0.6 | 0.6 | 0.6 | 0.6 | 0.6 |
| Permeation side pressure Ps | kPaA | 100 | 100 | Variable | 100 | 100 | 100 |
| Sweep gas flow rate Fs | Nm³/h | 90 | 120 | 120 | Variable | 100 | 150 |
| Humidities of Sweep gas | %RH | 70 | 70 | 70 | 70 | 70 | 70 |
| Composition ratio of sweep gas (wet base) Ar | | 0.8605 | 0.8605 | - | 0.8605 | 0.8605, 0.5092 | 0.8605 |
| Composition ratio of sweep gas (wet base) H₂O | | 0.1395 | 0.1395 | - | 0.1395 | 0.1395, 0.4908 | 0.1395 |
| CO₂ permeance | mol/(m² s kPa) | $1.5 \times 10^{-5}$ | ↓ | ↓ | ↓ | $1.5 \times 10^{-5}, 2.0 \times 10^{-5}$ | $1.5 \times 10^{-5}$ |
| CH₄ permeance | mol/(m² s kPa) | $1.0 \times 10^{-7}$ | ↓ | ↓ | ↓ | ↓ | ↓ |
| H₂O permeance | mol/(m² s kPa) | $4.0 \times 10^{-5}$ | ↓ | ↓ | ↓ | ↓ | ↓ |

Fig. 11

POWER GENERATION SYSTEM

TECHNICAL FIELD

The present invention relates to a power generation system including a gas engine that generates kinetic energy by consuming a fuel gas containing methane as a main component and carbon dioxide, and a generator that generates electricity by being driven by the kinetic energy generated by the gas engine, and more particularly, to a power generation system that uses a mixed gas containing methane and carbon dioxide as a main component, which is derived from a biogas generated by methane fermentation of an organic substance such as biomass or organic waste, as a fuel gas.

BACKGROUND ART

In recent years, it has drawn attention to utilize, as a new energy source, a biogas obtained by methane fermentation of organic waste such as biomass and sewage sludge. The biogas is used as a substitute for fossil fuel, and is used for power generation, boiler, and the like.

The biogas is mainly composed of methane and carbon dioxide, and the methane concentration may vary in the range of about 50% to 75% and the carbon dioxide concentration may vary in the range of about 25% to 50% depending on the conditions for producing methane gas (fermentation conditions) and the type of raw material. The biogas also contains a very small amount of sulfur compounds such as siloxane and hydrogen sulfide, which must be removed at the time of use.

On the other hand, gas engines that use a mixed gas containing methane as a main component, such as biogas, as a fuel include a biogas engine in which biogas is assumed to be used directly as a fuel, and a natural gas engine in which natural gas is assumed to be used as a fuel. In order to use biogas as a fuel for a natural gas engine, it is necessary to previously reduce the carbon dioxide concentration in the biogas in order to increase the purity of methane to about 90% or more. Further, in the case of a biogas engine, the carbon dioxide concentration in the mixed gas is set as a specification value to, for example, about 35% to 40% and allowed.

As a power generating apparatus using a biogas engine, for example, the following Patent Document 1 discloses a biogas power generating apparatus that controls the total number of gas engines to be driven and the driving of surplus gas combustion devices in accordance with the pressure at which biogas is supplied to the engine.

Further, the following Patent Document 2 discloses a power generation system in which carbon dioxide and hydrogen sulfide in biogas are absorbed and separated using an alkaline absorption liquid to purify the biogas and the methane concentration is stably increased to 90% or more, and then the biogas is used as a fuel for an engine-type power generation apparatus using a gas engine or a gas turbine or a fuel cell-type power generation apparatus using a fuel cell.

PRIOR ART DOCUMENTS

Patent Documents

Patent Document 1: Japanese Patent Application Publication No. 2010-209706

Patent Document 2: Japanese Patent Application Publication No. 2002-275482

SUMMARY OF THE INVENTION

Problems to be Solved by the Invention

In the above-mentioned biogas engine that uses a mixed gas containing methane as a main component, such as biogas, as a fuel or a gas engine such as a natural gas engine, a variation in methane concentration not only causes a variation in the output of the engine, but also causes a large load on the engine and lowers the service life of the engine.

Further, even if carbon dioxide is removed or separated at a constant carbon dioxide removal rate with respect to biogas in which the carbon dioxide concentration and the methane concentration vary greatly, the carbon dioxide concentration and the methane concentration of the obtained mixed gas are not necessarily stable, and as a result, the variation in the methane concentration becomes a factor for lowering the service life of the engine.

The present invention has been made in view of the above-mentioned problems, and an object thereof is to provide a power generation system in which a fuel gas containing methane as a main component and carbon dioxide is supplied to an engine to generate power, and in which the fluctuation of the carbon dioxide concentration and the methane concentration of the fuel gas is suppressed, and the load applied to the engine is reduced, thereby making it possible to extend the life of the engine.

Means for Solving the Problem

As the first feature, a power generation system according to the present invention comprises: a gas engine for generating kinetic energy by consuming a fuel gas containing methane as a main component and carbon dioxide; and a generator for generating electricity by being driven by the kinetic energy generated by the gas engine, wherein the power generation system further comprises: a fuel gas supply device for controlling a concentration of target component gas which is at least one of methane and carbon dioxide in a mixed gas supplied from outside within a setting range with respect to the concentration of the target component gas in the fuel gas to the gas engine, and then supplying the mixed gas to the gas engine as the fuel gas; and a gas concentration sensor for measuring at least one of carbon dioxide concentration and methane concentration in the mixed gas, wherein, the fuel gas supply device is provided with a carbon dioxide removal device for removing carbon dioxide in the mixed gas, and an operating condition control device for controlling an operating condition that affects an increase or decrease of a carbon dioxide removal rate of the carbon dioxide removal device, wherein the gas concentration sensor is disposed in at least one of a front stage and a rear stage of the carbon dioxide removal device, and wherein the operating condition control device controls the operating condition of the carbon dioxide removal device based on the measurement result of the gas concentration sensor, thereby controlling the concentration of methane and carbon dioxide in the mixed gas.

According to the power generation system of the first feature described above, even if the methane concentration and the carbon dioxide concentration of the mixed gas supplied from the outside to the fuel gas supply device fluctuate largely as in the case of biogas, it is possible to control the carbon dioxide removal rate of the carbon dioxide removal device to increase or decrease in accordance with the fluctuation in the concentration, and therefore, the mixed gas whose methane concentration or carbon dioxide concentration is controlled within the setting range corresponding to the gas engine used is supplied to the gas engine as the fuel gas, so that even if the fluctuation in the concentration of the mixed gas supplied from the outside is large, the load applied to the gas engine can be greatly reduced, and the service life of the gas engine can be extended. For example, in the situation that the mixed gas is stably supplied at a certain carbon dioxide concentration and methane concentration, and the carbon dioxide removal device removes carbon dioxide at a certain carbon dioxide removal rate with respect to the mixed gas, lowers the carbon dioxide concentration, increases the methane concentration, and controls at least one of the carbon dioxide concentration and the methane concentration within the setting range of the gas engine to stably operate the gas engine, when the carbon dioxide concentration of the mixed gas increases and the methane concentration decreases, the operating condition control device can control the operating condition of the carbon dioxide removal device to increase the carbon dioxide removal rate, thereby suppressing the increase of the carbon dioxide concentration of the mixed gas and the decrease of the methane concentration, so that the stable operation of the gas engine can be maintained. When the carbon dioxide concentration of the mixed gas decreases and the methane concentration increases, the operating condition control device can control the operating condition of the carbon dioxide removal device to lower the carbon dioxide removal rate, so that the stable operation of the gas engine can be maintained in the same manner.

Since the methane concentration increases or decreases when the carbon dioxide concentration decreases or increases, if one of carbon dioxide and methane is set as a target of concentration measurement or concentration control (target component gas), the other concentration measurement or concentration control becomes possible. Therefore, it is not necessarily required to perform concentration measurement and concentration control separately using both carbon dioxide and methane as the target component gases, but both may be used as the target component gases, and concentration measurement and concentration control may be performed separately.

Further, the mixed gas for which at least one of the carbon dioxide concentration and the methane concentration is to be measured by the gas concentration sensor may be one of before and after the concentration of the target component gas is controlled within the setting range in the fuel gas supply device, or may be a mixed gas of both before and after the target component gas concentration is controlled.

Further, as the second feature in addition to the above-mentioned first feature, the power generation system according to the present invention is configured such that the carbon dioxide removal device comprises a carbon dioxide separation membrane for selectively separating carbon dioxide contained in the mixed gas from methane, and a first treatment chamber and a second treatment chamber separated by the carbon dioxide separation membrane, wherein the first treatment chamber is provided with a first inlet for receiving the mixed gas into the first treatment chamber and a first outlet for discharging the mixed gas whose concentration of the target component gas is controlled in the first treatment chamber as the fuel gas, wherein the second treatment chamber is provided with a second outlet for discharging the gas permeated from the first treatment chamber into the second treatment chamber through the carbon dioxide separation membrane, and wherein the operating condition control device controls at least one of operating condition candidates to be controlled including a flow rate of the mixed gas supplied into the first treatment chamber, a pressure in the first treatment chamber, a pressure in the second treatment chamber, an ambient temperature of the carbon dioxide separation membrane, and a membrane area of the carbon dioxide separation membrane, as the operating condition affecting the increase or decrease of the carbon dioxide removal rate of the carbon dioxide separation membrane, based on the measurement result of the gas concentration sensor.

Further, in the power generation system according to the present invention, as the third feature in addition to the second feature, the second treatment chamber has a second inlet for receiving a sweep gas into the second treatment chamber, the gas permeated from the first treatment chamber into the second treatment chamber through the carbon dioxide separation membrane and the sweep gas are discharged from the second outlet, and the flow rate of the sweep gas supplied into the second treatment chamber is included in the operating condition candidates to be controlled.

According to the power generation system of the second or third feature, the increase or decrease of the carbon dioxide removal rate performed by the operating condition control device controlling the operating condition of the carbon dioxide removal device can be used by combining one or more of the plurality of operating conditions of the carbon dioxide separation membrane in accordance with the degree of variation of the carbon dioxide concentration and the methane concentration, and the carbon dioxide concentration and the methane concentration can be controlled with higher accuracy.

Further, in the power generation system according to the present invention, as the fourth feature in addition to the second or third feature, the carbon dioxide separation membrane is a facilitated transport membrane to which a carbon dioxide carrier that selectively reacts with carbon dioxide without reacting with methane is added, and at least one operating condition that affects an increase or decrease of at least one of the relative humidity in the first treatment chamber and the relative humidity in the second treatment chamber is included in the operating condition candidates to be controlled.

Here, the "carbon dioxide carrier" is a substance having an effect that the membrane permeation rate of carbon dioxide is facilitated by the facilitated transport mechanism by containing a substance constituting the carrier in the membrane.

According to the power generation system of the fourth feature, since the carbon dioxide carrier in the facilitated transport membrane selectively reacts with the carbon dioxide in the mixed gas, and selectively separates the carbon dioxide with respect to the methane, it is possible to efficiently separate the methane and the carbon dioxide. That is, it is possible to effectively lower the carbon dioxide concentration of the mixed gas and increase the methane concentration. Further, in the facilitated transport membrane, since the energy generated at the time of the reaction between carbon dioxide and carrier is used for the energy for the carrier to release carbon dioxide, it is not necessary to supply the energy from the outside, and it is essentially energy-saving, so that the energy saving of the control of the concentration of methane and carbon dioxide in the mixed gas can be achieved. Further, since the carbon dioxide separation membrane can efficiently separate carbon dioxide with a small membrane area, particularly in the case of the facilitated transport membrane, it is possible to downsize the device as compared with other carbon dioxide removal devices, and as a result, it is possible to downsize the entire power generation system.

Further, in the power generation system according to the fourth feature, it is preferable that at least one of the mixed gas supplied into the first treatment chamber and the sweep gas supplied into the second treatment chamber contains water vapor. However, when water vapor is contained in the sweep gas, it is limited to the case having the above-mentioned third feature. As a result, moisture necessary for the facilitated transport mechanism of carbon dioxide is ensured in the membrane, so that the intrinsic performance as the facilitated transport membrane is exhibited.

Further, as the fifth feature in addition to the fourth feature, the power generation system according to the present invention comprises a water vapor supply unit for supplying water vapor to a target gas that is at least one of the mixed gas to be supplied into the first treatment chamber and the sweep gas to be supplied into the second treatment chamber. However, the case where the target gas contains the sweep gas is limited to the case where the third feature is provided.

According to the power generation system of the fifth feature, moisture necessary for the facilitated transport mechanism of carbon dioxide is ensured in the membrane, so that the intrinsic performance as the facilitated transport membrane is exhibited.

In the power generation system according to the fifth feature, it is preferable that the operating condition control device controls the amount of water vapor added from the water vapor supply unit to the target gas as one of the operating condition candidates to be controlled. As a result, the relative humidity of the target gas can be easily controlled.

Further, in the power generation system of the fifth feature, it is preferable that the water vapor supply unit supplies water vapor generated by heating water by heat exchange with a high-temperature exhaust gas discharged from the gas engine to the target gas, or that the water vapor supply unit supplies water vapor included in the exhaust gas discharged from the gas engine to the target gas. As a result, the waste heat or the waste water vapor in the exhaust gas can be effectively utilized, and energy saving in the entire power generation system can be further achieved.

Further, as the sixth feature in addition to the fourth or fifth feature, the power generation system according to the present invention comprises a desulfurization device using an ultra-high desulfurization catalyst for removing a sulfur component contained in the mixed gas, which includes a gas derived from a biogas produced by methane fermentation of an organic substance.

According to the power generation system of the sixth feature, since the influence of the sulfur component contained in the mixed gas on the carbon dioxide carrier can be eliminated in advance, the original performance as the facilitated transport membrane can be maintained.

Further, in the power generation system according to the present invention, as the seventh feature in addition to any one of the above features, the fuel gas supply device comprises a first gas supply device for supplying a first concentration adjustment gas containing methane as a main component, which has a concentration of the target component gas lower than the setting range when the target component gas is carbon dioxide or a concentration of the target component gas higher than the setting range when the target component gas is methane, to the mixed gas, and the first gas supply device supplies the first concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is higher than the setting range, or when the target component gas is methane and the concentration of the target component gas of the mixed gas is lower than the setting range.

According to the power generation system of the seventh feature described above, in the case where the decrease in the methane concentration and the increase in the carbon dioxide concentration of the mixed gas are large, or in the case where the change occurs abruptly, the control of the operating condition of the carbon dioxide removal device by the operating condition control device cannot sufficiently cope with the change in the concentration, and it is difficult to control the carbon dioxide concentration or the methane concentration within the setting range, or even in the case where the operating condition control device or the carbon dioxide removal device does not function for some reason, by supplying the first concentration adjustment gas to the mixed gas, it becomes possible to directly suppress the decrease in the methane concentration and the increase in the carbon dioxide concentration, and it becomes possible to control the carbon dioxide concentration or the methane concentration within the setting range.

Further, in the power generation system of the seventh feature, it is preferable that the first gas supply device comprises a second carbon dioxide removal device for selectively separating carbon dioxide contained in the mixed gas with respect to methane, and a first container for storing the first concentration adjustment gas prepared in advance by separating carbon dioxide from the mixed gas using the second carbon dioxide removal device. As a result, the first concentration adjustment gas can be prepared in advance by using the mixed gas supplied from the outside to the fuel gas supply device, so that it is not necessary to separately prepare a high-purity methane gas such as natural gas for the first concentration adjustment gas.

Further, in the power generation system according to the present invention, as the eighth feature in addition to any one of the above features, the fuel gas supply device comprises a second gas supply device for supplying a second concentration adjustment gas containing carbon dioxide or methane and carbon dioxide as a main component, which has a concentration of the target component gas higher than the setting range when the target component gas is carbon dioxide or a concentration of the target component gas lower than the setting range when the target component gas is methane, to the mixed gas, and the second gas supply device supplies the second concentration adjustment gas to the mixed gas based on the measurement result of the gas concentration sensor when the target component gas is carbon dioxide and the concentration of the target component gas of the mixed gas is lower than the setting range, or when the target component gas is methane and the concentration of the target component gas of the mixed gas is higher than the setting range.

According to the power generation system of the eighth feature described above, in the case where the variation range of the increase of the methane concentration and the decrease of the carbon dioxide concentration of the mixed gas is large, or in the case where the variation occurs abruptly, the control of the operating conditions of the carbon dioxide removal device by the operating condition control device cannot sufficiently cope with the variation of the carbon dioxide concentration or the methane concentration is difficult to control within the setting range, or even in the case where the operating condition control device or the carbon dioxide removal device does not function for some reason, by supplying the second concentration adjustment gas to the mixed gas, it becomes possible to directly suppress the increase of the methane concentration and the decrease of the carbon dioxide concentration, and it becomes possible to control the carbon dioxide concentration or the methane concentration within the setting range.

Further, in the power generation system according to the eighth feature, it is preferable that the second gas supply device comprises a second container for storing the second concentration adjustment gas, and the second concentration adjustment gas includes carbon dioxide removed from the mixed gas by the carbon dioxide removal device. As a result, the carbon dioxide removed from the mixed gas by the carbon dioxide removal device can be reused, and it is not necessary to separately prepare carbon dioxide for the second concentration adjustment gas. In addition, when the carbon dioxide removed from the mixed gas by the carbon dioxide removal device contains methane contained in the mixed gas in part, effective utilization of the methane can also be achieved.

As the ninth feature, a power generation system according to the present invention comprises: a gas engine for generating kinetic energy by consuming a fuel gas containing methane as a main component and carbon dioxide; and a generator for generating electricity by being driven by the kinetic energy generated by the gas engine, wherein the power generation system further comprises: a fuel gas supply device for controlling a concentration of target component gas which is at least one of methane and carbon dioxide in a mixed gas supplied from outside within a setting range with respect to the concentration of the target component gas in the fuel gas to the gas engine, and then supplying the mixed gas to the gas engine as the fuel gas; and a gas concentration sensor for measuring at least one of carbon dioxide concentration and methane concentration in the mixed gas, wherein the fuel gas supply device comprises: a first gas supply device for supplying a first concentration adjustment gas containing methane as a main component, which has a concentration of the target component gas lower than the setting range when the target component gas is carbon dioxide or a concentration of the target component gas higher than the setting range when the target component gas is methane, to the mixed gas; and a second gas supply device for supplying a second concentration adjustment gas containing carbon dioxide or methane and carbon dioxide as a main component, which has a concentration of the target component gas higher than the setting range when the target component gas is carbon dioxide or a concentration of the target component gas lower than the setting range when the target component gas is methane, to the mixed gas, wherein the first gas supply device supplies the first concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is higher than the setting range, or when the target component gas is methane and the concentration of the target component gas of the mixed gas is lower than the setting range, and wherein the second gas supply device supplies the second concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is lower than the setting range, or when the target component gas is methane and the concentration of the target component gas of the mixed gas is higher than the setting range.

According to the power generation system of the ninth feature, even if the concentration of methane and the concentration of carbon dioxide of the mixed gas supplied from the outside to the fuel gas supply device largely fluctuates as in the case of biogas, it is possible to control the concentration of methane and carbon dioxide in the mixed gas by supplying either the first concentration adjustment gas or the second concentration adjustment gas to the mixed gas in accordance with the concentration fluctuation, so that the mixed gas whose concentration of methane or carbon dioxide is controlled within the setting range corresponding to the gas engine used is supplied to the gas engine as the fuel gas, and therefore, even if the concentration fluctuation of the mixed gas supplied from the outside is large, the load applied to the gas engine can be greatly reduced, and the life of the gas engine can be extended. For example, when the carbon dioxide concentration of the mixed gas is increased and the methane concentration is decreased in a situation where the mixed gas is stably supplied at a certain carbon dioxide concentration and methane concentration and the gas engine is stably operated, the first gas supply device can supply the first concentration adjustment gas to the mixed gas to suppress the increase of the carbon dioxide concentration of the mixed gas and the decrease of the methane concentration, so that the stable operation of the gas engine can be maintained. When the carbon dioxide concentration of the mixed gas is decreased and the methane concentration is increased, the second gas supply device can supply the second concentration adjustment gas to the mixed gas to suppress the decrease of the carbon dioxide concentration of the mixed gas and the increase of the methane concentration, so that the stable operation of the gas engine can be maintained in the same manner.

Further, in the power generation system of the ninth feature, it is preferable that the fuel gas supply device comprises a carbon dioxide removal device for selectively separating carbon dioxide contained in the mixed gas with respect to methane, and first and second containers for separately storing the first concentration adjustment gas and the second concentration adjustment gas prepared in advance by separating carbon dioxide from the mixed gas using the carbon dioxide removal device. Thus, when the mixed gas is supplied to the carbon dioxide removal device, the carbon dioxide concentration of the mixed gas decreases and the methane concentration increases, so that the first concentration adjustment gas can be prepared, the second concentration adjustment gas can be prepared by collecting the carbon dioxide separated by the carbon dioxide removal device, and the first concentration adjustment gas and the second concentration adjustment gas prepared in advance can be separately stored in the first container and the second container, and can be used for the first gas supply device and the second gas supply device.

Further, in the power generation system according to any one of the above features, it is preferable that the mixed gas includes a gas derived from a biogas produced by methane fermentation of an organic substance. As a result, it is possible to realize a power generation system having a high service life using biogas.

Effect of the Invention

According to the power generation system of the present invention, in a power generation system for generating power by supplying a fuel gas containing methane as a main component and carbon dioxide to an engine, it is possible to suppress fluctuations in the carbon dioxide concentration and the methane concentration of the fuel gas, to maintain stable operation of the gas engine, and it is possible to realize a power generation system with a high service life.

BRIEF DESCRIPTION OF THE DRAWINGS

FIG. 11 is a list showing conditions used to obtain the simulation results shown in FIGS. 5 to 10.

DESCRIPTION OF EMBODIMENT

Hereinafter, a power generation system according to some embodiments of the present invention (hereinafter, referred to as "the present system" as appropriate) will be described with reference to the drawings.

First Embodiment

Figure 1:
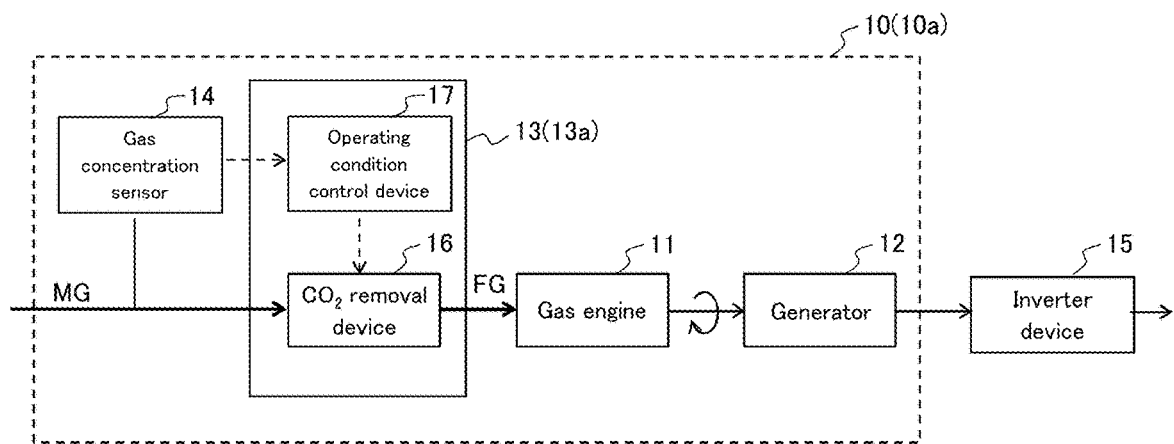
FIG. 1 is a block diagram schematically showing an example of a schematic configuration of a power generation system according to the first and second embodiments.

First, a schematic configuration of the present system according to the first embodiment will be described with reference to the drawings. FIG. 1 is a block diagram schematically showing an example of a schematic configuration of the system 10.

As shown in FIG. 1, the present system 10 comprises a gas engine 11, a generator 12, a fuel gas supply device 13, and a gas concentration sensor 14. In the present embodiment, as shown in FIG. 1, it is assumed that one gas engine 11 and one generator 12 are provided, respectively, but a plurality of gas engines 11 or multiple sets of gas engines 11 and generators 12 may be provided for one fuel gas supply device 13. The arrows in FIG. 1 show the flow paths and directions in which the gas flows in a simplified manner. In addition, descriptions of three-way valves, mixing valves, and the like, which are necessary in the gas flow path, are omitted. The same applies to respective configuration diagrams of main parts of the present system to be described later. In the configuration diagrams of the main parts, the same constituent elements are denoted by the same reference symbols, and the description thereof is omitted in some cases.

The gas engine 11 is a biogas engine, a natural gas engine, or the like that mixes a fuel gas FG containing methane as a main component and carbon dioxide such as biogas or natural gas with air and combusts the fuel gas FG in a combustion chamber, converts heat energy generated by a combustion reaction of the fuel gas FG into kinetic energy, and outputs the converted heat energy. An engine control unit for performing operation control of the gas engine 11 (for example, control of the supply amount and supply timing of the fuel gas FG, ignition timing, throttle opening degree (supply amount of air), valve timing (opening and closing timing of the intake valve and the exhaust valve), and the like) is attached as a part of the gas engine 11, and is not shown in FIG. 1. In addition, an auxiliary power source (such as a storage battery) for supplying electric power necessary for operation to the gas engine 11 including the engine control unit is also omitted from the drawing.

The generator 12 is configured using an alternating current generator such as a synchronous generator or an induction generator having a rotor and a stator, and converts kinetic energy supplied from the gas engine 11 into electric energy to output AC (alternating-current) power. The structure and type of the alternating current generator is not limited to any particular structure and type. The AC power output from the generator 12 is output to the inverter device 15 as necessary, and in the inverter device 15, after the primary AC power output from the generator 12 is temporarily converted to DC (direct-current) power, the primary AC power is converted to secondary AC power of a desired frequency, voltage, and format (single phase or three phase), and is supplied to a predetermined power load, and is grid-connected as necessary. The inverter device 15 is not necessarily a component of the system 10, but may be part of the system 10.

The fuel gas supply device 13 is a device that controls the concentration (dry base) of at least one of methane and carbon dioxide in the mixed gas MG including methane and carbon dioxide as main component, which is supplied from the outside, within a setting range with respect to the concentration (dry base) of the target component gas in the fuel gas FG of the gas engine 11, and supplies the gas as a fuel gas FG to the gas engine 11. In the present embodiment, it is assumed that a mixed gas derived from a biogas obtained by methane fermentation of an organic waste such as biomass or sewage sludge is used as the mixed gas MG. In the mixed gas MG derived from biogas, impurities such as hydrogen sulfide and siloxane, among components derived from biogas, are removed in advance before being supplied to the fuel gas supply device 13 by using an impurity removal device (not shown) such as an existing desulfurization device or an activated carbon adsorption type siloxane removal device. Hereinafter, unless otherwise specified, in the description of each embodiment, the carbon dioxide concentration and the methane concentration of the mixed gas MG, the fuel gas FG, and the like are dry base concentrations.

As the desulfurization device, a wet desulfurization method using an absorption liquid or an adsorption desulfurization method using a sulfur adsorption material such as zinc oxide or iron oxide can be used. Also, sulfur can be completely removed to the ppb level or less by using a copper zinc-based super-high desulfurization catalyst. In particular, when a facilitated transport membrane is used for the $CO_2$ separation membrane 20, which will be described later, the facilitated transport membrane may be influenced by hydrogen sulfide depending on the type of carrier used and the concentrations thereof, and therefore, super-high desulfurization catalysts are preferably used.

The mixed gas MG may be supplied to the fuel gas supply device 13 using various supply modes, for example, the mixed gas MG may be directly supplied to the fuel gas supply device 13 from a biogas production facility via pipeline, the above-mentioned impurity removal device, and the like, or may be supplied to the fuel gas supply device 13 via the pipeline, the above-mentioned impurity removal device, and the like after the biogas is temporarily stored in the storage tank from the biogas production facility.

Further, the fuel gas supply device 13 comprises a $CO_2$ removal device 16 for removing carbon dioxide in the mixed gas MG, and an operating condition control device 17 for controlling operating conditions that affect an increase or decrease of the carbon dioxide removal rate of the $CO_2$ removal device 16.

The $CO_2$ removal device 16 is available by various gas separation methods such as a membrane separation method, a chemical absorption method, a pressure-swing adsorption (PSA) method, a thermal-swing adsorption (TSA) method, and the like, but in the present embodiment, the $CO_2$ removal device 16 is configured to include a $CO_2$ separation membrane 20 by a membrane separation method.

Figure 2A:
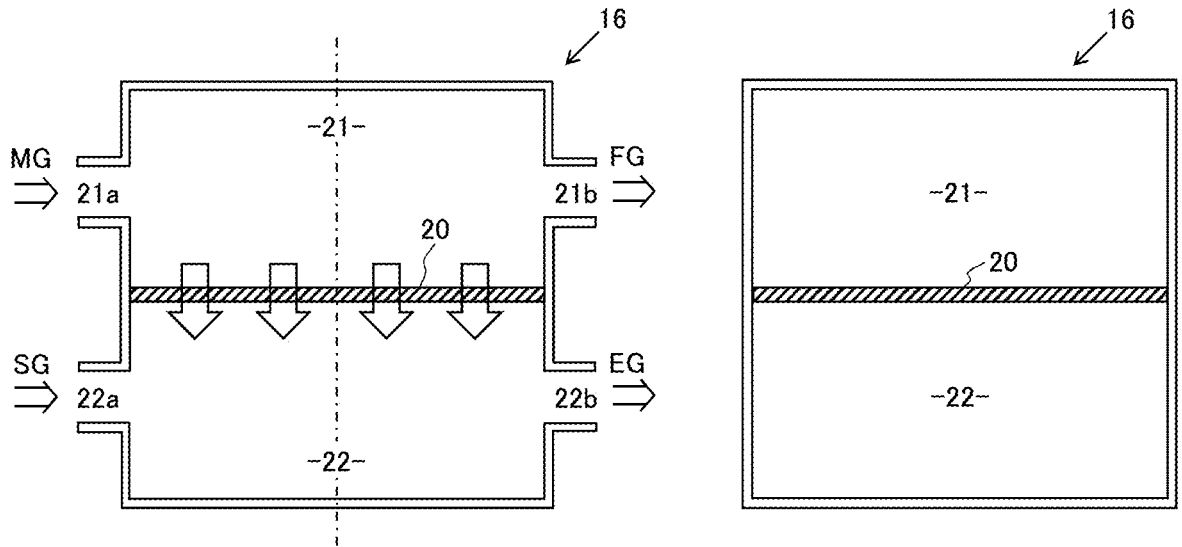
FIGS. 2A and 2B are cross-sectional views schematically showing the structures of a $CO_2$ removal device including a $CO_2$ separation membrane used in the first to third embodiments.
Figure 2B:
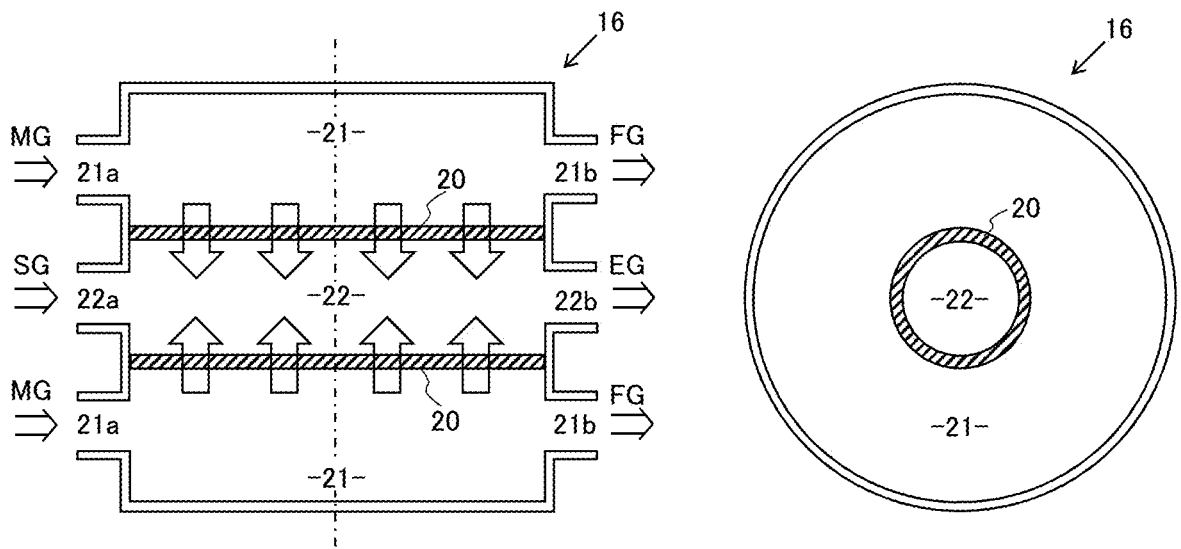

Specifically, as shown in FIGS. 2A and 2B, the $CO_2$ removal device 16 comprises a $CO_2$ separation membrane 20, a first treatment chamber 21 and a second treatment chamber 22 separated by the $CO_2$ separation membrane 20. The first treatment chamber 21 is provided with a first inlet 21a for receiving the mixed gas MG into the first treatment chamber 21, and a first outlet 21b for discharging the mixed gas in which the concentration of the target component gas (methane or carbon dioxide) in the mixed gas MG in the first treatment chamber 21 is controlled within the setting range (the setting range Wch4 of the methane concentration or the setting range Wco2 of the carbon dioxide concentration) as a fuel gas FG to the outside of the first treatment chamber 21 in a manner to be described later. The second treatment chamber 22 is provided with a second inlet 22a for receiving the sweep gas SG into the second treatment chamber 22, and a second outlet 22b for discharging the mixed gas EG of the sweep gas SG and a part of the mixed gas MG that has permeated from the first treatment chamber 21 to the second treatment chamber 22 through the $CO_2$ separation membrane 20. FIG. 2A is two types of cross-sectional views schematically showing the schematic structures of the $CO_2$ removal device 16 when the $CO_2$ separation membrane 20 has a flat plate shape. The cross-sections of the cross-sectional views of FIG. 2A are orthogonal to the $CO_2$ separation membrane 20 and orthogonal to each other. FIG. 2B is two types of cross-sectional views schematically showing the schematic structures of the $CO_2$ removal device 16 when the $CO_2$ separation membrane 20 is cylindrical. The cross-sections of the cross-sectional views of FIG. 2B are a cross-section passing through the axis of the cylindrical $CO_2$ separation membrane 20 and a cross-section perpendicular to the axis. Therefore, the dimensional ratio of each part of FIGS. 2A and 2B does not necessarily coincide with the dimensional ratio of each part of the actual $CO_2$ removal device 16. The arrows in FIGS. 2A and 2B schematically indicate the flow directions of the gases in the respective parts.

The setting range Wch4 of methane concentration is assumed to be 65%±5% or 70%±5% or the like, for example, when the gas engine 11 is a biogas engine, and 80%±5% or 85%±5% or the like, for example, when the gas engine 11 is a natural gas engine. In addition, the setting range Wco2 of the carbon dioxide concentration is assumed to be 35%±5% or 30%±5% or the like, for example, when the gas engine 11 is a biogas engine, and 20%±5% or 15%±5% or the like, for example, when the gas engine 11 is a natural gas engine. However, in the case that both the setting range Wch4 of the methane concentration and the setting range Wco2 of the carbon dioxide concentration are set, when the methane concentration is within the setting range Wch4, the carbon dioxide concentration must also be set to be within the setting range Wco2.

As the $CO_2$ separation membrane 20, in the present embodiment, a $CO_2$ facilitated transport membrane in which a well-known $CO_2$ carrier which does not react with methane but selectively reacts with carbon dioxide is added to a gel membrane is used. In the $CO_2$ facilitated transport membrane, carbon dioxide also permeates as a reaction product with the $CO_2$ carrier in addition to the physical permeation by the dissolution/diffusion mechanism, so that the permeation rate is facilitated. On the other hand, gases such as methane, nitrogen, and hydrogen, which do not react with the $CO_2$ carrier, permeate only by dissolution/diffusion mechanism, so that the separation factors of carbon dioxide with respect to these gases are extremely large. The same applies to inert gases such as argon and helium, which do not react with the $CO_2$ carrier, so that the permeability of argon and helium as compared with carbon dioxide is extremely low. Further, since the energy generated at the time of the reaction between the carbon dioxide and the $CO_2$ carrier is used for the $CO_2$ carrier to release carbon dioxide, there is no need to supply the energy from the outside, and it is essentially an energy saving process.

Examples of the $CO_2$ carrier include carbonates and bicarbonates of alkali metals such as cesium carbonate and cesium bicarbonate, and rubidium carbonate and rubidium bicarbonate. Similarly, hydroxides of alkali metals such as cesium hydroxide or rubidium hydroxide are equivalent because they react with carbon dioxide to produce carbonates and bicarbonates. In addition, amino acids such as 2,3-diaminopropionic acid salt (DAPA) and glycine are known to exhibit high $CO_2$ selective permeation performance.

The $CO_2$ facilitated transport membrane can be formed by supporting a gel layer formed by including the $CO_2$ carrier in the gel membrane on a hydrophilic or hydrophobic porous membrane. Examples of a membrane material constituting the gel membrane include polyvinyl alcohol (PVA) membranes, polyacrylic acid (PAA) membranes, and polyvinyl alcohol-polyacrylic acid (PVA/PAA) salt copolymer membranes. It is known that the $CO_2$ facilitated transport membrane of this structure exhibits a high $CO_2$ selective permeation performance (see, for example, patent publications such as Japanese Patent No. 4621295, Japanese Patent Application Laid-Open No. 2008-036463, and Japanese Patent Laid-Open No. 2013-049048).

However, the permeation rate of carbon dioxide in the $CO_2$ facilitated transport membrane is very small when there is no moisture in the membrane, and moisture in the membrane is indispensable for obtaining a high permeation rate. Therefore, it is preferable that the gel membrane is a hydrogel membrane. By constituting the gel membrane by a highly water retaining hydrogel membrane, it is possible to keep moisture in the membrane as much as possible even in an environment where moisture in the gel membrane is reduced (for example, at high temperature of 100° C. or higher), and high $CO_2$ permeance can be realized. In the above example, the polyvinyl alcohol-polyacrylic acid (PVA/PAA) salt copolymer membrane and the polyacrylic acid membrane are hydrogel membranes. The hydrogel is a three-dimensional network structure formed by cross-linking a hydrophilic polymer by chemical cross-linking or physical cross-linking, and has a property of swelling by absorbing water.

Figure 3:
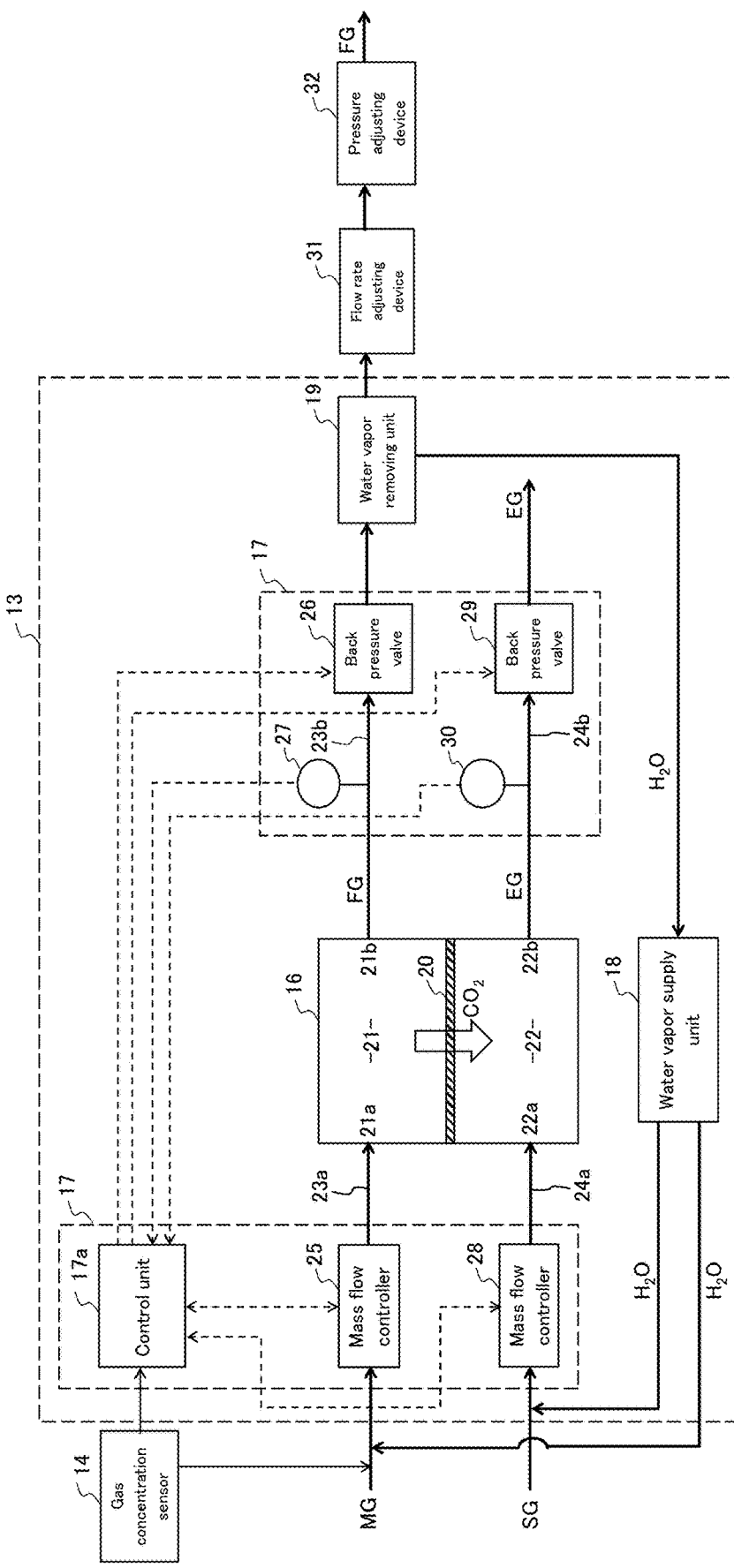
FIG. 3 is a block diagram schematically showing a configuration example of a fuel gas supply device, an operating condition control device, and a water vapor supply unit according to the first embodiment.

In the present embodiment, since the $CO_2$ facilitated transport membrane is used as the $CO_2$ separation membrane 20, moisture required for the gel membrane is supplied to the gel membrane as described above. For this purpose, the $CO_2$ removal device 16 comprises a water vapor supply unit 18 for supplying water vapor to both the mixed gas MG and the sweep gas SG. The water vapor supply unit 18 generates water vapor internally or receives a supply of water vapor from the outside, and supplies the water vapor separately to the first supply pipe 23a coupled to the first inlet 21a and the second supply pipe 24a coupled to the second inlet 22a, as shown in FIG. 3. As a result, the relative humidities of the mixed gas MG and the sweep gas SG can be set to arbitrary predetermined values separately. In the case where the water vapor supply unit 18 generates water vapor inside, the water vapor may be generated by heating water by heat exchange with a high-temperature exhaust gas discharged from the gas engine 11. This makes it possible to effectively utilize the waste heat of the exhaust gas.

Further, in the present embodiment, since water vapor is added to the mixed gas MG from the water vapor supply unit 18, water vapor is also included in the fuel gas FG immediately after being discharged from the first outlet 21b. In order to perform the process of removing the water vapor from the fuel gas FG prior to supplying the fuel gas FG to the gas engine 11, in the present embodiment, the water vapor removing unit 19 is installed in the first exhaust pipe 23b coupled to the first outlet 21b.

As the water vapor removing unit 19, a known configuration such as a configuration using a condenser or a configuration using a water vapor permeable membrane such as a perfluoro-based membrane (or a perfluorosulfonic acid-based membrane) can be used. For example, when a water vapor permeable membrane is used, since water vapor is recovered in a gaseous state (with latent heat) instead of water in a cooled liquid state, at least a part of the removed water vapor is returned to the water vapor supply unit 18 as it is, and can be reused as water vapor to be mixed with the mixed gas MG and the sweep gas SG (see FIG. 3). As the water vapor permeable membrane, it is also possible to use the above-mentioned facilitated transport membrane. In this case, the facilitated transport membrane may be made of a material different from or the same as the material of the $CO_2$ separation membrane 20. An example of a water vapor selective permeable membrane using a facilitated transport membrane is disclosed in WO 2012/014900.

Figure 4:
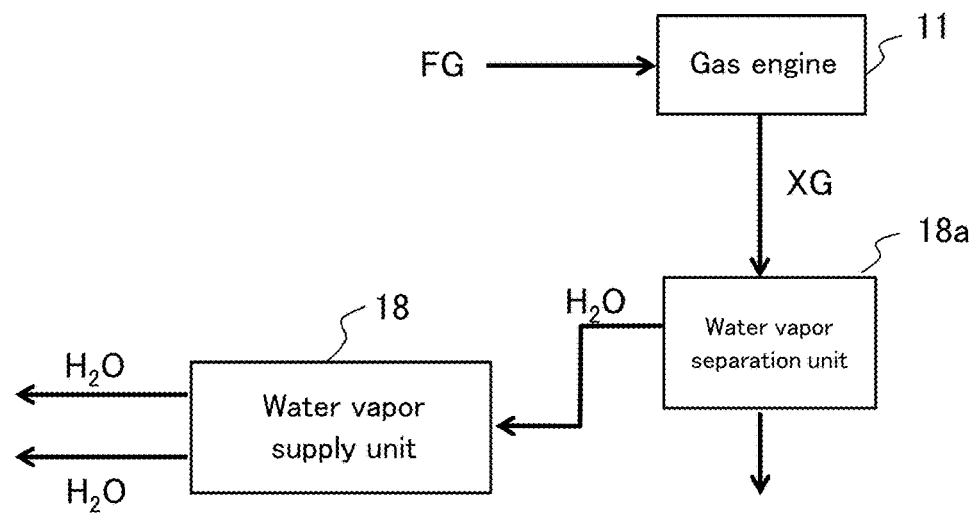
FIG. 4 is a block diagram schematically showing another configuration example of the water vapor supply unit.

Further, as shown in FIG. 4, a water vapor separation unit 18a may be provided on the flow path of the exhaust gas XG discharged from the gas engine 11 to separate water vapor contained in the exhaust gas XG. The separated water vapor is supplied to the water vapor supply unit 18, and can be added to the mixed gas MG and the sweep gas SG. As the water vapor separation unit 18a, a known configuration using a water vapor permeable membrane can be used, similarly to the above-described water vapor removing unit 19. Further, a facilitated transport membrane can be used for the water vapor separation unit 18a.

As shown in FIGS. 2A and 2B, various shapes such as a flat plate shape or a tubular shape (for example, a cylindrical shape) are conceivable as the $CO_2$ facilitated transport membrane. For example, when the $CO_2$ facilitated transport membrane is formed by forming a gel membrane containing a $CO_2$ carrier on the outer peripheral surface or the inner peripheral surface of a cylindrical porous support, one of the first treatment chamber 21 and the second treatment chamber 22 is formed inside the cylindrical $CO_2$ facilitated transport membrane, and the other of the first treatment chamber 21 and the second treatment chamber 22 is formed outside thereof. Further, when it is required to increase the membrane area of the $CO_2$ facilitated transport membrane in order to improve the processing capacity of the $CO_2$ removal device 16, a plurality of $CO_2$ facilitated transport membranes may be provided in one housing by increasing the number of flat or tubular $CO_2$ facilitated transport membranes, and a plurality of at least one of the first treatment chamber 21 and the second treatment chamber 22 may be formed so that the plurality of first treatment chambers 21 are communicated with each other and/or the plurality of second treatment chambers 22 are communicated with each other to increase the membrane area.

In the present embodiment, the operating condition control device 17 controls at least one of the operating condition candidates to be controlled including the flow rate (supply gas flow rate Ff) of the mixed gas MG supplied into the first treatment chamber 21, the pressure (supply side pressure Pf) in the first treatment chamber 21, the pressure (permeate side pressure Ps) in the second treatment chamber 22, the flow rate (sweep gas flow rate Fs) of the sweep gas SG supplied into the second treatment chamber 22, the ambient temperature Ta of the $CO_2$ separation membrane 20, and the membrane area Sm of the $CO_2$ separation membrane 20, as the operating condition affecting the increase or decrease of the carbon dioxide removal rate of the $CO_2$ removal device 16, that is, the operating condition affecting the increase or decrease of the carbon dioxide removal rate of the $CO_2$ separation membrane ($CO_2$ facilitated transport membrane) 20, based on the measurement result of the gas concentration sensor 14 to be described later. The operating condition control device 17 controls at least one of the operating conditions included in the operating condition candidates to be controlled to increase or decrease the carbon dioxide removal rate of the $CO_2$ removal device 16, and as a result, performs control to maintain the methane concentration or the carbon dioxide concentration of the fuel gas FG within the setting range Wch4 or the setting range $Wco_2$.

As shown in FIGS. 1 and 3, the gas concentration sensor 14 is a gas sensor for measuring the concentration of at least one of methane concentration (dry base) and carbon dioxide concentration (dry base) of the mixed gas MG, which is installed in the first supply pipe 23a coupled to the first inlet 21a, that is, in the front stage of the $CO_2$ removal device 16. In the present embodiment, since the mixed gas MG is derived from biogas, the methane concentration may vary in a range of about 50% to 75% exceeding the explosion upper limit concentration (15 vol %) on a dry base, and the carbon dioxide concentration may vary in a range of about 25% to 50%, so that the gas concentration sensor 14 uses a well-known gas sensor capable of measuring a high concentration covering the above-mentioned variation range regardless of whether the target component gas is methane or carbon dioxide. Further, the gas concentration sensor 14 may be installed in the rear stage of the $CO_2$ removal device 16. In this instance, since the methane concentration of the mixed gas (fuel gas FG) after passing through the $CO_2$ removal device 16 is controlled within the above-mentioned setting range Wch4 and the carbon dioxide concentration is controlled within the above-mentioned setting range Wco2, the gas concentration sensor 14 uses a well-known gas sensor capable of measuring a high concentration covering the above-mentioned setting range regardless of whether the target component gas is methane or carbon dioxide. In addition, even if the target component gas is either methane or carbon dioxide, in the mixed gas MG derived from biogas, the concentration fluctuation of methane and carbon dioxide mainly occurs, and when one increases and the other decreases accordingly, the gas concentration sensor 14 may measure only one of the methane concentration and the carbon dioxide concentration, and may derive the other from one measurement result. In the following description, the measurement (measure, measured) is collectively referred to as "measurement (measure, measured) or the like" including the case where the other is derived from the measurement result of one of the methane concentration and the carbon dioxide concentration.

As shown in FIG. 3, the operating condition control device 17 comprises a mass flow controller 25 for controlling the flow rate of the mixed gas MG in the first supply pipe 23a coupled to the first inlet 21a when the supply gas flow rate Ff is used as the operating condition, a back pressure valve 26 in the first exhaust pipe 23b coupled to the first outlet 21b and a pressure gauge 27 in the upstream side of the back pressure valve 26 when the supply side pressure Pf is used as the operating condition, a mass flow controller 28 for controlling the flow rate of the sweep gas SG in the second supply pipe 24a coupled to the second inlet 22a when the sweep gas flow rate Fs is used as the operating condition, a back pressure valve 29 in the second exhaust pipe 24b coupled to the second outlet 22b and a back pressure gauge 30 in the upstream side of the back pressure valve 29 when the permeate side pressure Ps is used as the operating condition, and a control unit 17a to control the mass flow controllers 25 and 28 and the back pressure valves 26 and 29, so that each of the above-mentioned operating conditions is controllable. Since the mass flow controllers 25 and 28 also function as mass flow meters, the control states of the supply gas flow rate Ff and the sweep gas flow rate Fs by the mass flow controllers 25 and 28 can be confirmed by themselves. The pressure gauge 27 confirms the control state of the supply side pressure Pf by the back pressure valve 26, and the pressure gauge 30 confirms the control state of the permeate side pressure Ps by the back pressure valve 29. Therefore, depending on which of the operating conditions of the supply gas flow rate Ff, the supply side pressure Pf, the sweep gas flow rate Fs, and the permeate side pressure Ps is used as the control target, a necessary combination of the mass flow controller 25, the back pressure valve 26 and the pressure gauge 27, the mass flow controller 28, and the back pressure valve 29 and the pressure gauge 30 is installed at the predetermined positions. The control unit 17a is a control device capable of processing a digital signal, an analog signal, or the like composed of a microcomputer, a programmable logic, or the like.

Further, the operating condition control device 17 is, for example, disposed in thermostatic chamber when the ambient temperature Ta of the $CO_2$ separation membrane 20 is used as the operating condition, and the $CO_2$ separation membrane 20 is divided into a plurality of membrane units, and the first treatment chamber 21 and the second treatment chamber 22 are respectively provided to each membrane unit so that the number of membrane units for supplying the mixed gases MG can be increased or decreased when the membrane area Sm of the $CO_2$ separation membrane 20 is used as the operating condition, and the operating condition control device 17 is configured so that the respective operating conditions of the ambient temperature Ta and the membrane area can be controlled from the control unit 17a.

Figure 5:
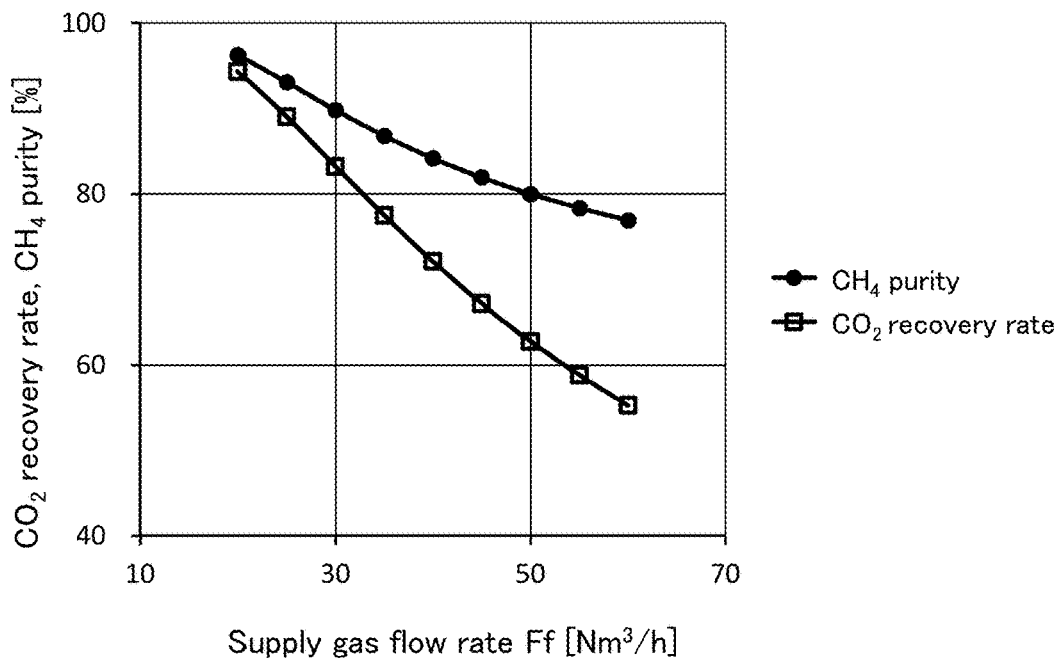
FIG. 5 is a graph showing a result of simulating the relationship between the $CO_2$ recovery rate of the $CO_2$ removal device, the $CH_4$ purity of the fuel gas, and the supply gas flow rate Ff.
Figure 6:
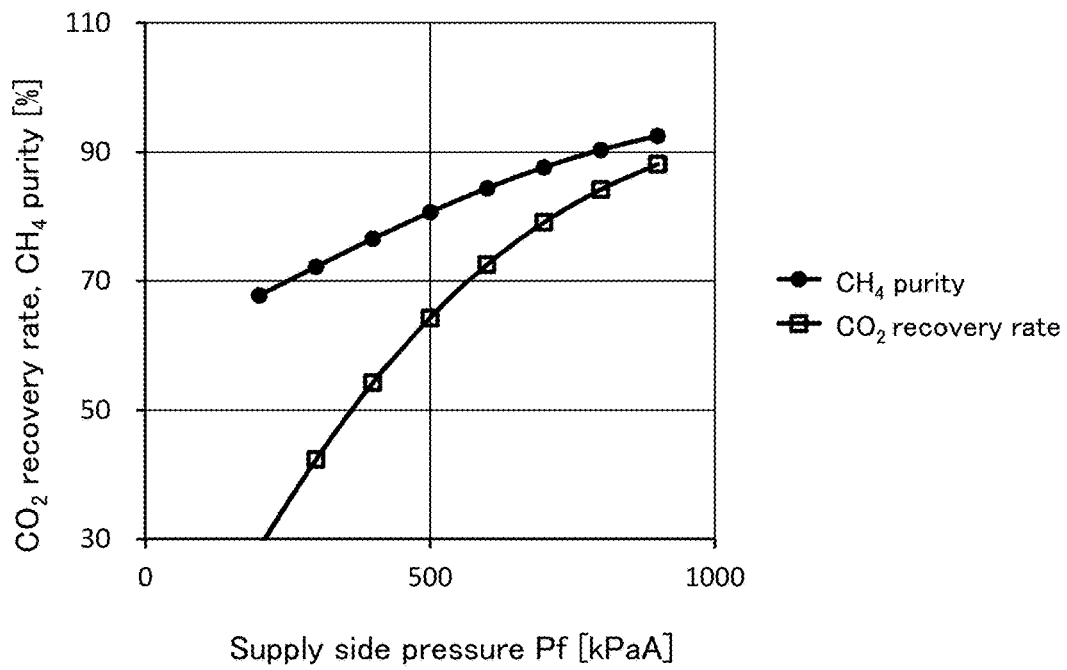
FIG. 6 is a graph showing a result of simulating the relationship between the $CO_2$ recovery rate of the $CO_2$ removal device and the $CH_4$ purities of the fuel gases and the supply side pressures Pf.
Figure 7:
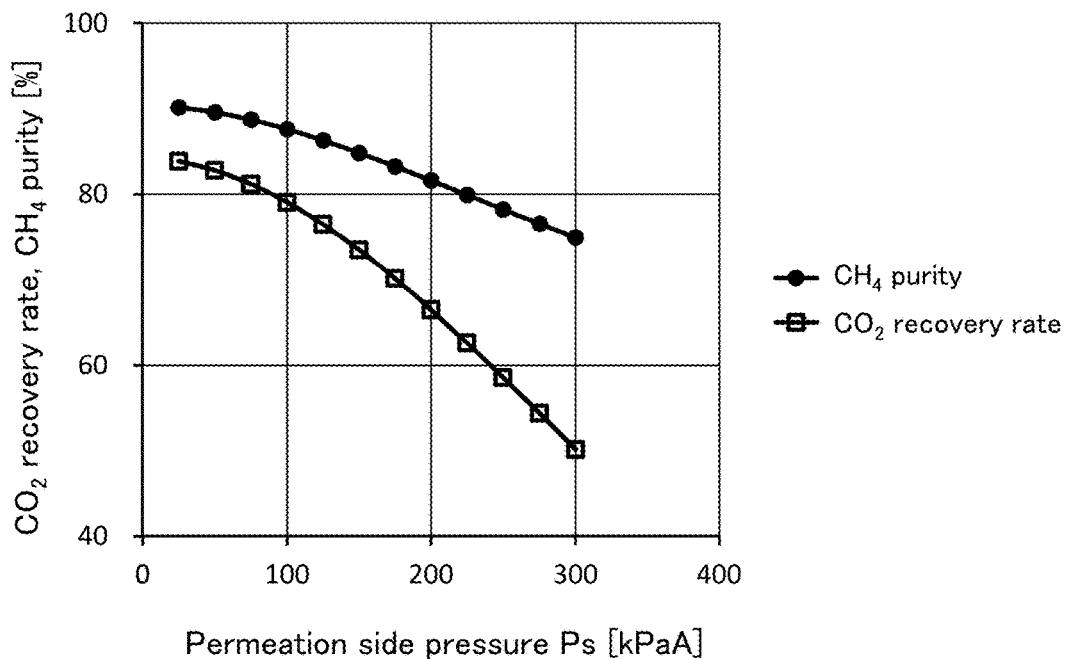
FIG. 7 is a graph showing the results of simulating the relationship between the $CO_2$ recovery rate of the $CO_2$ removal device, the $CH_4$ purity of the fuel gas, and the permeate side pressure Ps.
Figure 8:
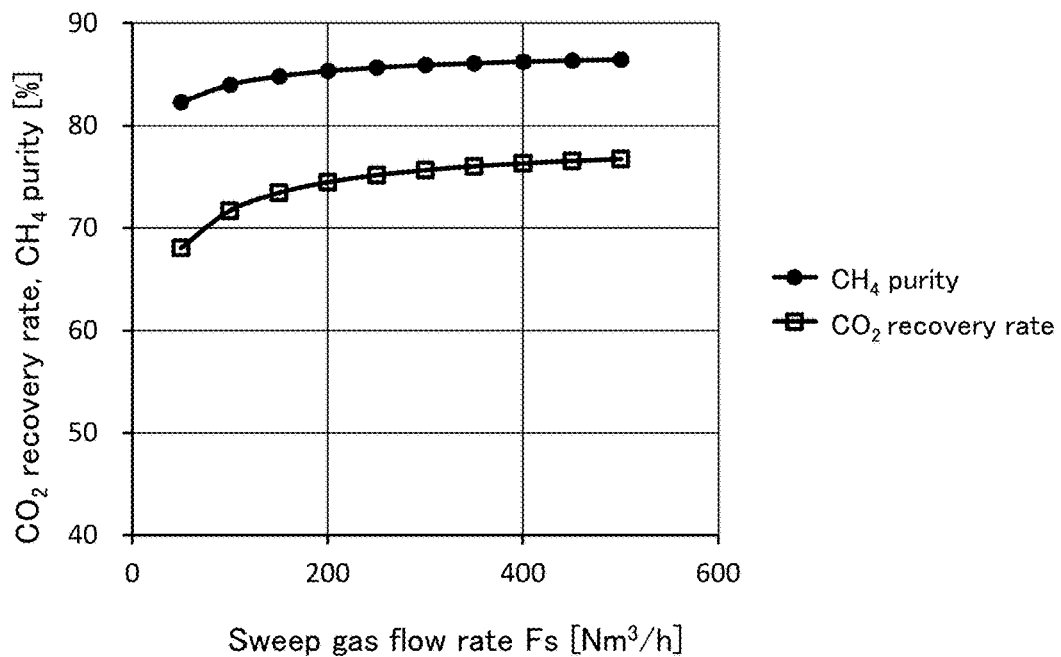
FIG. 8 is a graph showing the results of simulating the relationship between the $CO_2$ recovery rate of the $CO_2$ removal device, the $CH_4$ purity of the fuel gas, and the sweep gas flow rate Fs.
Figure 9:
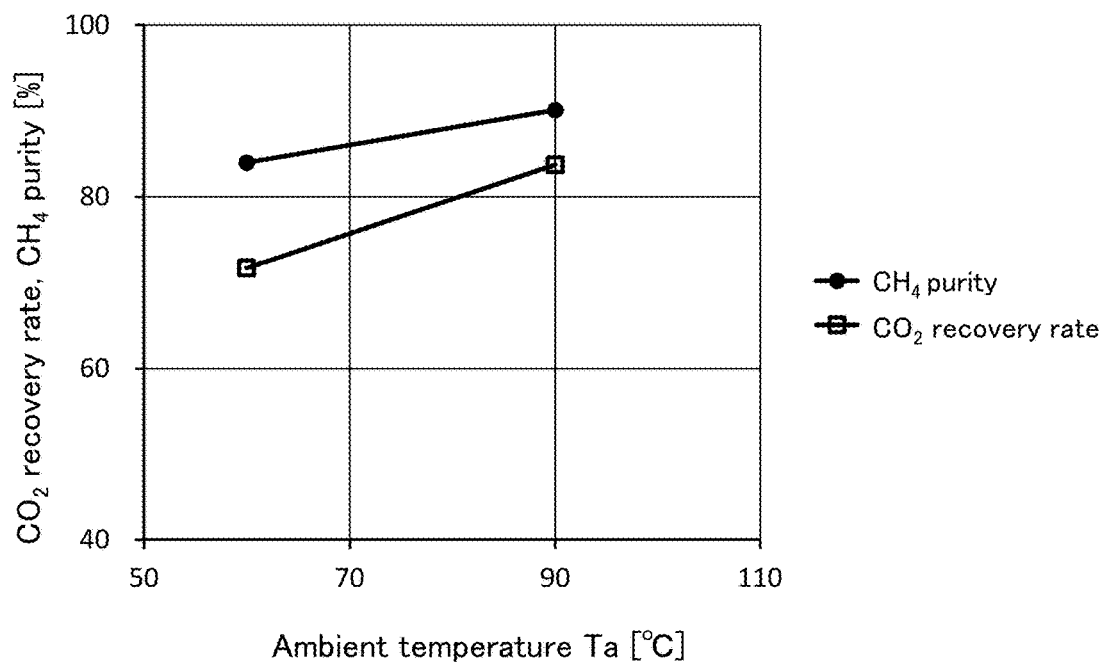
FIG. 9 is a graph showing the results of simulating the relationships between the $CO_2$ recovery rate of the $CO_2$ removal device and the $CH_4$ purity of the fuel gas and the ambient temperature Ta.
Figure 10:
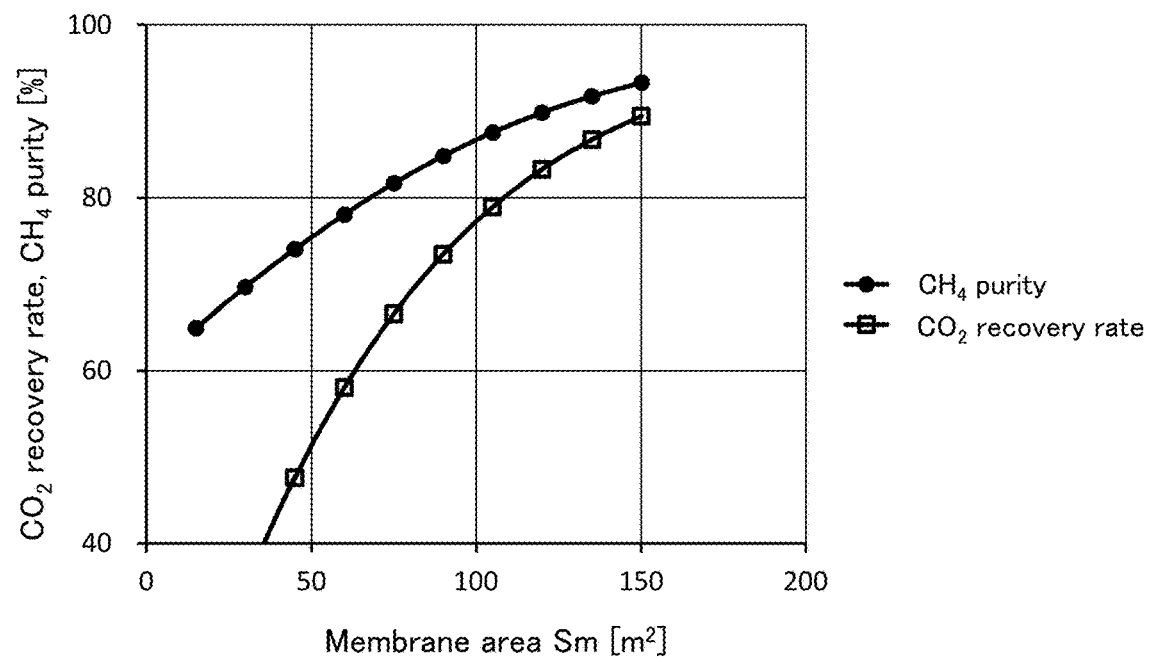
FIG. 10 is a graph showing the results of simulating the relationship between the $CO_2$ recovery rate of the $CO_2$ removal device, the $CH_4$ purity of the fuel gas, and the membrane area Sm.

Next, FIG. 5 to FIG. 10 show simulation results showing that each of the above-mentioned operating conditions can actually control the increase or decrease of the carbon dioxide removal rate, by the operating condition. FIG. 5 shows simulation results when the operating condition is the supply gas flow rate Ff, FIG. 6 shows simulation results when the operating condition is the supply side pressure Pf, FIG. 7 shows simulation results when the operating condition is the permeate side pressure Ps, FIG. 8 shows simulation results when the operating condition is the sweep gas flow rate Fs, FIG. 9 shows simulation results when the operating condition is the ambient temperature Ta, and FIG. 10 shows simulation results when the operating condition is the membrane area Sm. The respective vertical axes of FIGS. 5 to 10 indicate the $CO_2$ recovery rate [%] of the $CO_2$ removal device 16 and the $CH_4$ purities [%] of the fuel gas FG, and the respective horizontal axes indicate the corresponding operating condition. The $CO_2$ recovery rate [%] is calculated as a value (percentage) obtained by dividing the flow rate of carbon dioxide in the mixed gas EG discharged from the second outlet 22b by the flow rate of carbon dioxide in the mixed gas MG, and represents the carbon dioxide removal rate. The $CH_4$ purity [%] is calculated as a value (percentage) obtained by dividing the flow rate of methane in the fuel gas FG discharged from the first outlet 21b by the flow rate (dry base) of the fuel gas FG.

The conditions used for each simulation are collectively shown in FIG. 11. In FIG. 11, the values of the items used as the operating conditions are indicated as "variable". In FIG. 11, the composition ratio (volume ratio) of the mixed gas MG is shown on a dry basis, but steam (water vapor) is added so that the relative humidity is maintained at 70% under the temperature and pressure conditions shown in FIG. 11. The composition ratio (volume ratio:wet base) of the sweep gas SG is set so that the relative humidity is maintained at 70% under the same temperature and pressure conditions. In FIG. 7, when the relative humidity is fixed to 70%, the composition ratio of the sweep gas SG changes in accordance with the permeation pressure Ps. Therefore, the composition ratio of the sweep gas SG is not shown in FIG. 11. In each of the simulations, the relative humidity of the mixed gas MG and the sweep gas SG is fixed to 70% in order to eliminate the influence of the variation of the relative humidity, and to evaluate only the influence of each of the above operating conditions on the $CO_2$ recovery rate [%] of the $CO_2$ removal device 16 and the $CH_4$ purity [%] of the fuel gas FG.

Except when the operating condition is the ambient temperature Ta, the $CO_2$ permeance=$1.5\times10^{-5}$ [mol/($m^2$skPa)], $CH_4$ permeance=$1.0\times10^{-7}$ [mol/($m^2$skPa)], and $H_2O$ permeance=$4.0\times10^{-5}$ [mol/($m^2$skPa)]) were treated as constant values, respectively, for convenience as the membrane performance of the $CO_2$ separation membrane ($CO_2$ facilitated transport membrane) 20 used in the simulations. When the operating condition is the ambient temperature Ta, the $CO_2$ permeance is directly changed in accordance with the change of the ambient temperature Ta. Each of the actual membrane performances varies depending on the operating conditions, but is enough for examining the approximate relationships between the operating conditions and the $CO_2$ recovery rate [%] of the $CO_2$ removal device 16 and the $CH_4$ purities [%] of the fuel gas FG by simulations.

As shown in FIG. 5, when the supply gas flow rate Ff is used as the operating condition, the $CO_2$ recovery rate [%] and the $CH_4$ purity [%] decrease as the supply gas flow rate Ff increases, and are found to have negative correlations with the supply gas flow rate Ff. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a controls the mass flow controller 25 to decrease the supply gas flow rate Ff to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the setting range Wch4, or when the carbon dioxide concentration measured by the gas concentration sensor 14 or the like is lower than the setting range Wco2, the control unit 17a controls the mass flow controller 25 to increase the supply gas flow rate Ff to decrease the $CO_2$ recovery rate, so that the methane concentration of the fuel gas FG can be maintained in the setting range Wch4 or the carbon dioxide concentration can be maintained in the setting range Wco2.

As shown in FIG. 6, when the supply side pressure Pf is used as the operating condition, the $CO_2$ recovery rate [%] and the $CH_4$ purity [%] increase as the supply side pressure Pf increases, and are found to have positive correlations with the supply side pressure Pf. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a controls the back pressure valve 26 to increase the supply side pressure Pf to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the above-mentioned setting range Wch4, or when the carbon dioxide concentration measured by the gas concentration sensor 14 or the like is lower than the setting range Wco2, the control unit 17a controls the back pressure valve 26 to decrease the supply-side pressure Pf to decrease the $CO_2$ recovery rate, whereby the methane concentration of the fuel gas FG can be maintained in the setting range Wch4 or the carbon dioxide concentration can be maintained in the setting range Wco2.

As shown in FIG. 7, when the permeate side pressure Ps is used as the operating condition, the $CO_2$ recovery rate [%] and the $CH_4$ purity [%] decrease as the permeate side pressure Ps increases, and are found to have negative correlations with the permeate side pressure Ps. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a controls the back pressure valve 29 to decrease the permeate side pressure Ps to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the setting range Wch4, or when the carbon dioxide concentration measured by the gas concentration sensor 14 or the like is lower than the setting range Wco2, the control unit 17a controls the back pressure valve 29 to increase the permeate side pressure Ps to decrease the $CO_2$ recovery rate, so that the methane concentration of the fuel gas FG can be maintained in the setting range Wch4 or the carbon dioxide concentration can be maintained in the setting range Wco2.

As shown in FIG. 8, when the sweep gas flow rate Fs is used as the operating condition, the $CO_2$ recovery rate [%] and the $CH_4$ purity [%] increase as the supply gas flow rate Ff increases, and are found to have positive correlations with the sweep gas flow rate Fs. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a controls the mass flow controller 28 to increase the sweep gas flow rate Fs to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the setting range Wch4, or when the carbon dioxide concentration measured by the gas concentration sensor 14 or the like is lower than the setting range Wco2, the control unit 17a controls the mass flow controller 28 to decrease the sweep gas flow rate Fs to decrease the $CO_2$ recovery rate, so that the methane concentration of the fuel gas FG can be maintained in the setting range Wch4 or the carbon dioxide concentration can be maintained in the setting range Wco2.

As shown in FIG. 9, when the ambient temperature Ta is used as the operating condition, the $CO_2$ recovery rate [%] and the $CH_4$ purity [%] increase as the ambient temperature Ta increases, and are found to have positive correlations with the ambient temperature Ta. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a performs the control of increasing the ambient temperature Ta with respect to the thermostatic chamber to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the setting range Wch4, or when the carbon dioxide concentration measured by the gas concentration sensor 14 or the like is lower than the setting range Wco2, the control unit 17a performs the control of decreasing the ambient temperature Ta with respect to the thermostatic chamber to decrease the $CO_2$ recovery rate, so that the methane concentration of the fuel gas FG can be maintained in the setting range Wch4, or the carbon dioxide concentration can be maintained in the setting range Wco2.

As shown in FIG. 10, when the membrane area Sm is used as the above operating condition, the $CO_2$ recovery rate [%] and the $CH_4$ purity [%] increase as the membrane area Sm increases, and are found to have positive correlations with the membrane area Sm. As a result, when the methane concentration measured by the gas concentration sensor 14 or the like is lower than the setting range Wch4 or when the carbon dioxide concentration measured by the gas concentration sensor 14 or the like is higher than the setting range Wco2, the control unit 17a performs control to increase the number of membrane units used for the $CO_2$ removal device 16 (membrane area Sm) to increase the $CO_2$ recovery rate, so that the methane concentration of the fuel gas FG can be maintained in the setting range Wch4 or the carbon dioxide concentration can be maintained in the setting range Wco2. Conversely, when the methane concentration measured by the gas concentration sensor 14 or the like is higher than the setting range Wch4, or when the carbon dioxide concentration measured by the gas concentration sensor 14 or the like is lower than the setting range Wco2, the control unit 17a performs control to decrease the number of membrane units used for the $CO_2$ removal device 16 (membrane area Sm) and to decrease the $CO_2$ recovery rate, so that the methane concentration of the fuel gas FG can be maintained in the setting range Wch4, or the carbon dioxide concentration can be maintained in the setting range Wco2.

From the results of simulations shown in FIGS. 5 to 10, it is understood that, even if any of the operating conditions of the supply gas flow rate Ff, the supply pressure Pf, the permeation pressure Ps, the sweep gas flow rate Fs, the ambient temperature Ta, and the membrane area Sm is used, since there is a positive or negative correlation between the operating conditions and the $CO_2$ recovery rate [%] and the $CH_4$ purity [%], the increase or decrease of the carbon dioxide removal rate can be controlled.

Here, it should be noted that the relative humidities of the mixed gas MG and the sweep gas SG are fixed to a constant value in each of the above simulations. In actual operation, the relative humidities of the mixed gas MG and the sweep gas SG are not necessarily fixed to a constant value, and it is further difficult to maintain each relative humidity at a constant value in the first processing chamber 21 and the second treatment chamber 22. For example, when the pressure in the first treatment chamber 21 or the second treatment chamber 22 (the supply side pressure Pf or the permeate side pressure Ps) increases, the partial pressure of water vapor in the first treatment chamber 21 or the second treatment chamber 22 increases, the relative humidity in the first treatment chamber 21 or the second treatment chamber 22 increases, and when the ambient temperature Ta of the $CO_2$ separation membrane 20 increases, the saturated vapor pressure in the first treatment chamber 21 or the second treatment chamber 22 increases, and the relative humidity in the first treatment chamber 21 or the second treatment chamber 22 decreases. As the relative humidities in the first treatment chamber 21 and the second treatment chamber 22 are higher, the facilitated transport function of the $CO_2$ facilitated transport membrane is exhibited better, the $CO_2$ permeance is increased, and the $CO_2$ recovery rate is increased.

The relative humidities in the first treatment chamber 21 and the second treatment chamber 22 vary depending on the amounts of steam (water vapor) added to the mixed gas MG and the sweep gas SG in addition to the pressure in the first treatment chamber 21 or the second treatment chamber 22 (the supply side pressure Pf or the permeate side pressure Ps) and the ambient temperature Ta of the $CO_2$ separation membrane 20. Therefore, although not evaluated in the above simulations, the amount of water vapor added to the mixed gas MG and the sweep gas SG can also be added to the above-mentioned operating condition candidates to be controlled together with the supply gas flow rate Ff, the supply side pressure Pf, the permeate side pressure Ps, the sweep gas flow rate Fs, the ambient temperature Ta, and the membrane area Sm as the operating conditions used by the operating condition control device 17, and the operating condition control device 17 can use at least one of the above-mentioned operating conditions including the amount of water vapor added in the above-mentioned operating condition candidates to be controlled.

As shown in FIG. 7, although the $CO_2$ recovery rate [%] and the $CH_4$ purity [%] have a negative correlation with the permeate side pressure Ps, on the other hand, in the case that the composition ratio (partial pressure ratio) of water vapor in the sweep gas SG supplied into the second treatment chamber 22 is constant, when the permeate side pressure Ps increases (or decreases), the relative humidity in the second treatment chamber 22 increases (or decreases) and the $CO_2$ recovery rate [%] and the $CH_4$ purity [%] increase (or decrease) so that the $CO_2$ recovery rate [%] and the $CH_4$ purity [%] have a positive correlation with the permeate side pressure Ps. That is, the effect of increasing or decreasing the permeate side pressure Ps is suppressed by a change in the relative humidity in the second treatment chamber 22. Therefore, in the case where the permeate side pressure Ps is used as the operating condition, it is preferable to perform control to change the water vapor partial pressure of the sweep gas SG by adjusting the amount of water vapor supplied from the water vapor supply unit 18 in accordance with the change in the permeate side pressure Ps so that the relative humidity of the sweep gas SG is maintained constant, as in the simulation.

Conversely, as shown in FIG. 6, the $CO_2$ recovery rate [%] and the $CH_4$ purity [%] have a positive correlation with the supply side pressures Pf, and on the other hand, in the case that the composition ratio (partial pressure ratio) of water vapor in the mixed gas MG supplied to the first treatment chamber 21 is constant, when the composition ratio (partial pressure ratio) of water vapor in the mixed gas MG supplied to the first treatment chamber 21 increases (or decreases), the relative humidity in the first treatment chamber 21 increases (or decreases) and the $CO_2$ recovery rate [%] and the $CH_4$ purity [%] increase (or decrease) so that the $CO_2$ recovery rate [%] and the $CH_4$ purity [%] have a positive correlation with the supply side pressures Pf. That is, the effect of increasing or decreasing the supply side pressure Pf is enhanced by a change in the relative humidity in the first treatment chamber 21. Therefore, when the supply side pressure Pf is used as the operating condition, it is not necessary to control the water vapor partial pressure of the mixed gas MG so that the relative humidity of the mixed gas MG is kept constant.

Further, as shown in FIG. 9, although the $CO_2$ recovery rate [%] and the $CH_4$ purity [%] have a positive correlation with the ambient temperature Ta, on the other hand, in the case that at least one of the composition ratio (partial pressure ratio) of the water vapor in the mixed gas MG supplied into the first treatment chamber 21 and the composition ratio (partial pressure ratio) of the water vapor in the sweep gas SG supplied into the second treatment chamber 22 is constant, when the ambient temperature Ta increases (or decreases), the saturated water vapor pressure increases (or decreases) and therefore the relative humidity of at least one of the first treatment chamber 21 and the second treatment chamber 22 decreases (or increases) and the $CO_2$ recovery rate [%] and the $CH_4$ purity [%] decrease (or increase) so that the $CO_2$ recovery rate [%] and the $CH_4$ purity [%] have a negative correlation of the ambient temperature Ta. That is, the effect of increasing or decreasing the ambient temperature Ta is suppressed by a change in the relative humidity of at least one of the first treatment chamber 21 and the second treatment chamber 22. Therefore, in the case where the ambient temperature Ta is used as the operating condition, it is preferable to adjust the amount of water vapor supplied from the water vapor supply unit 18 in accordance with the change of the ambient temperature Ta so that the relative humidities of the mixed gas MG and the sweep gas SG are kept constant, as in the simulation, and to perform control to change the water vapor partial pressures of the mixed gas MG and the sweep gas SG.

Prior to starting the operation of the present system 10, in accordance with the attributes of the $CO_2$ separation membrane ($CO_2$ facilitated transport membrane) 20 used in the $CO_2$ removal device 16, the relationship between the control values of the operating conditions actually used by the operating condition control device 17 among the supply gas flow rate Ff, the supply side pressure Pf, the permeate side pressure Ps, the sweep gas flow rate Fs, the ambient temperature Ta, and the membrane area Sm, at least one of the methane concentration and the carbon dioxide concentration of the mixed gas MG measured by the gas concentration sensor 14 or the like, and the concentration of the target component gas (methane or carbon dioxide) in the fuel gas FG whose concentration is controlled by the $CO_2$ removal device 16 is acquired in advance by experiments or the like. This relationship depends on the attributes of the $CO_2$ separation membrane ($CO_2$ facilitated transport membrane) 20, and therefore, of course, may differ from the results of simulations shown in FIGS. 5 to 10. Further, the operating conditions of the $CO_2$ removal device 16 at the time of operation of the present system 10 do not necessarily coincide with the conditions used in the simulations shown in FIG. 11. As a result, the operating condition control device 17 controls the value of the operating condition required for maintaining the concentration of the target component gas (methane or carbon dioxide) in the fuel gas FG within the setting range (methane concentration setting range Wch4 or carbon dioxide concentration setting range Wco2) based on at least one of the measured values of the methane concentration and the carbon dioxide concentration of the mixed gas MG measured by the gas concentration sensor 14 or the like during the operation of the present system 10 to a value derived from the relation obtained in advance by experiments or the like.

Further, in addition to or instead of the feed-forward control described above, the operating condition control device 17 may be configured to perform a feedback control for increasing or decreasing the value of the operating condition such that the gas concentration sensor 14 for measuring the concentration of the target component gas (methane or carbon dioxide) in the fuel gas FG is added or moved on the downstream side of the back pressure valve 26 of the first exhaust pipe 23b, and the concentration of the target component gas in the fuel gas FG is maintained within the setting range (the setting range Wch4 of the methane concentration or the setting range Wco2 of the carbon dioxide concentration) based on the measurement result of the gas concentration sensor 14.

Further, it is also preferable that the operating condition control device 17 increases the number of operating conditions to be used more than the number to be used normally when the change in the concentration of the target component gas measured by the gas concentration sensor 14 is sudden or excessive, thereby more quickly increasing or decreasing the carbon dioxide removal rate of the $CO_2$ removal device 16.

Further, when the supply gas flow rate Ff or the supply side pressure Pf is included in the above-mentioned operating condition used by the operating condition control device 17, the flow rate or the pressure of the fuel gas FG supplied from the first treatment chamber 21 toward the gas engine 11 changes in accordance with the change of the supply gas flow rate Ff or the supply side pressure Pf. Therefore, as shown in FIG. 3, when the supply gas flow rate Ff is used as the operating condition, in order to suppress the flow rate fluctuation of the fuel gas FG, it is preferable that a flow rate adjusting device 31 such as a mass flow controller for adjusting the flow rate to a predetermined value is interposed in the first supply pipe 23a, and in the case of using the supply side pressure Pf as the operating condition, a pressure adjusting device 32 such as a pressure adjusting valve for adjusting the pressure to a predetermined value is interposed on the downstream side of the back pressure valve 26 of the first supply pipe 23a in order to suppress the pressure fluctuation of the fuel gas FG.

Second Embodiment

Next, a second embodiment of the present system will be described with reference to the drawings.

Figure 12:
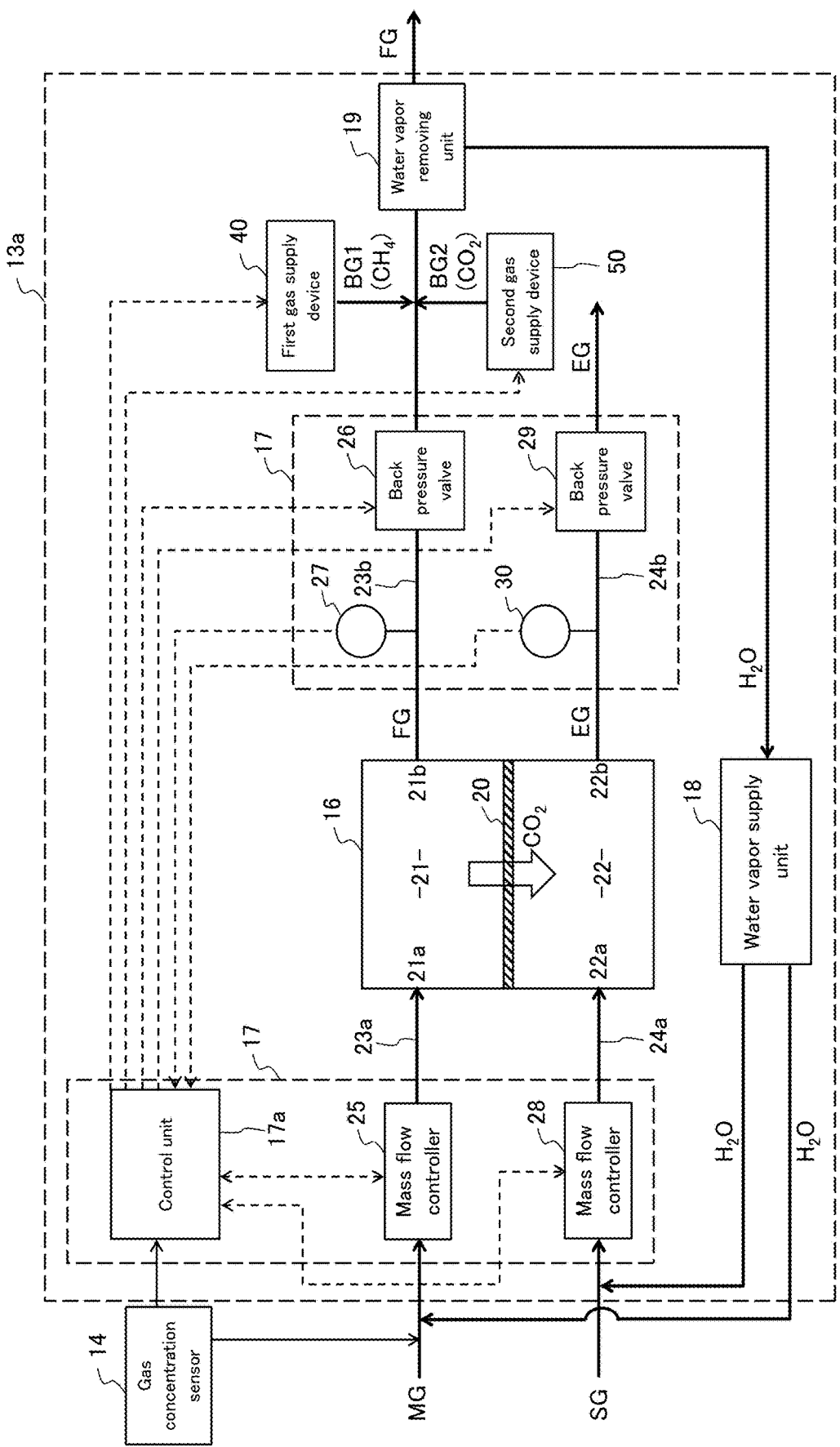
FIG. 12 is a block diagram schematically showing a configuration example of the fuel gas supply device and the operating condition control device according to the second embodiment.

As shown in FIG. 1, the schematic configuration of the present system 10a according to the second embodiment is basically the same as that of the present system 10 according to the first embodiment. The present system 10a and the present system 10 differ from each other in that, as shown in FIG. 12, the fuel gas supply device 13a of the present system 10a includes a first gas supply device 40 and a second gas supply device 50, and the first gas supply device 40 supplies the first concentration adjustment gas BG1 and the second gas supply device 50 supplies the second concentration adjustment gas BG2 to the first exhaust pipe 23b coupled to the first outlet 21b of the $CO_2$ removal device 16, but downstream of the back pressure valve 26 when the back pressure valve 26 is interposed on the first exhaust pipe 23b. The fuel gas supply device 13a is the same as the fuel gas supply device 13 of the first embodiment except for the added first gas supply device 40 and second gas supply device 50, and therefore a duplicated description thereof will be omitted. Further, since the gas engine 11, the generator 12, and the gas concentration sensor 14 are the same as those in the first embodiment, the description thereof will not be repeated.

Figure 13:
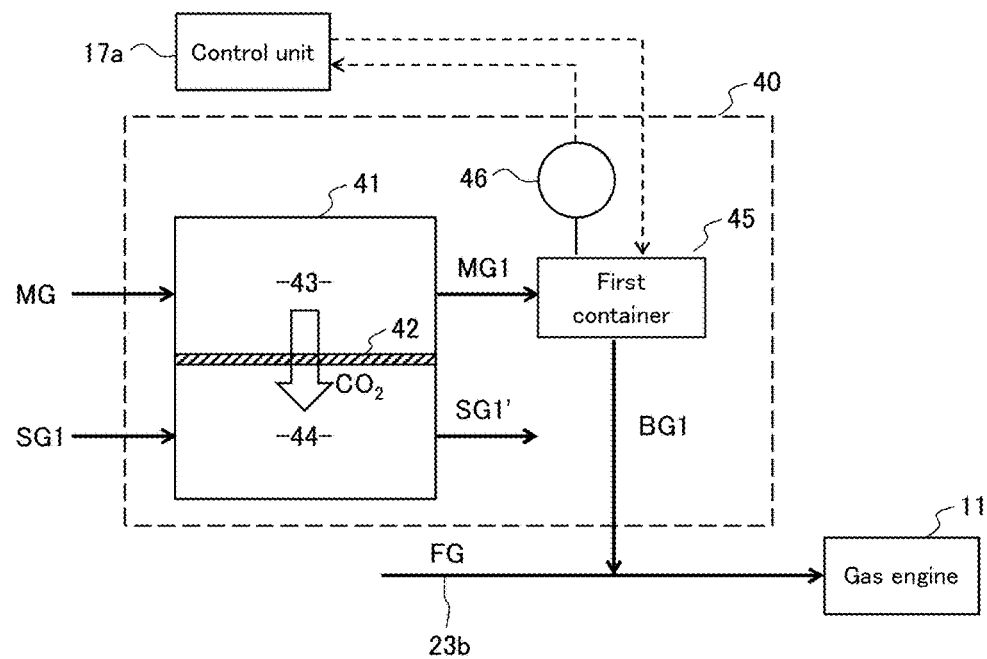
FIG. 13 is a block diagram schematically showing a configuration example of the first gas supply device according to the second embodiment.

As shown in FIG. 13, the first gas supply device 40 is configured to store the first concentration adjustment gas BG1, which is generated in advance so that the carbon dioxide concentration is lower than the setting range Wco2 of the carbon dioxide concentration, the methane concentration is higher than the setting range Wch4 of the methane concentration, or both, depending on whether the target component gas is methane or carbon dioxide, in the first container 45 and to supply the first concentration adjustment gas BG1 in the first container 45 to the first exhaust pipe 23b in accordance with an instruction from the control unit 17a. When the carbon dioxide concentration or the methane concentration measured by the gas concentration sensor 14 or the like is higher than the setting range Wco2 or lower than the setting range Wch4, the control unit 17a instructs the first gas supply device 40 to supply the first concentration adjustment gas BG1 to the first exhaust pipe 23b at a flow rate required for the carbon dioxide concentration or the methane concentration to be within the setting range Wco2 or within the setting range Wch4. When the state in which the carbon dioxide concentration or the methane concentration is higher than the setting range Wco2 or lower than the setting range Wch4 is not resolved after the control to increase or decrease (in this case, increase) the carbon dioxide removal rate of the $CO_2$ removal device 16 described in the first embodiment, the control unit 17a calculates the necessary flow rate as a flow rate necessary to bring the carbon dioxide concentration or the methane concentration after the control to within the setting range Wco2 or the setting range Wch4 in consideration of the measurement result of the gas concentration sensor 14 and the above-mentioned operating conditions of the $CO_2$ removal device 16.

Further, the first gas supply device 40 comprises a $CO_2$ separation device 41 that generates the first concentration adjustment gas BG1 in advance. The $CO_2$ separation device 41 has the same configuration as the $CO_2$ removal device 16, and comprises a $CO_2$ separation membrane 42 of a $CO_2$ facilitated transport membrane, and a first treatment chamber 43 and a second treatment chamber 44 separated by the $CO_2$ separation membrane 42. The mixed gas MG derived from the biogas which is the same as the mixed gas MG supplied to the first treatment chamber 21 of the $CO_2$ removal device 16 is supplied to the first treatment chamber 43 by using any of the various supply modes described in the first embodiment. Carbon dioxide in the mixed gas MG supplied to the first treatment chamber 43 selectively permeates through the $CO_2$ separation membrane 42 of the $CO_2$ facilitated transport membrane toward the second treatment chamber 44, so that the mixed gas MG1 whose carbon dioxide concentration is greatly decreased is discharged from the first treatment chamber 43 and stored in the first container 45 as the first concentration adjustment gas BG1. The sweep gas SG1 is supplied to the second treatment chamber 44 similarly to the $CO_2$ removal device 16, and the mixed gas SG1' of the sweep gas SG1 and a part of the mixed gas MG that has permeated from the first treatment chamber 43 to the second treatment chamber 44 is discharged from the second treatment chamber 44.

Since the $CO_2/CH_4$ selectivity of the facilitated transport membrane used for the $CO_2$ separation membrane 42 is, for example, 100 or more, an extremely high carbon dioxide removal rate can be realized by adjusting the operating condition of the $CO_2$ separation device 42. Therefore, by setting the carbon dioxide removal rate to be high in accordance with the setting range Wch4 and the setting range Wco2, the mixed gas MG1 discharged from the first treatment chamber 43 can be made to have the carbon dioxide concentration lower than the setting range Wco2 by a predetermined value (for example, 5 to 10 vol %) or more, or the methane concentration higher than the setting range Wch4 by a predetermined value (for example, 5 to 10 vol %) or more. Although the carbon dioxide concentration and the methane concentration of the mixed gas MG1 change with the change in the concentration of carbon dioxide and methane in the mixed gas MG supplied to the first treatment chamber 43, the condition that the carbon dioxide concentration and the methane concentration of the first concentration adjustment gas BG1 stored in the first container 45 are lower than the setting range Wco2 by the predetermined value or more and higher than the setting range Wch4 by the predetermined value or more is satisfied. However, since the actual concentrations of the first concentration adjustment gas BG1 is unknown, the first container 45 is provided with the same gas concentration sensor 46 as the gas concentration sensor 14, and the measured values of the carbon dioxide concentration and the methane concentration of the first concentration adjustment gas BG1 are notified to the control unit 17a. Then, the control unit 17a calculates the necessary flow rate in consideration of the measurement result of the gas concentration sensor 46.

Figure 14:
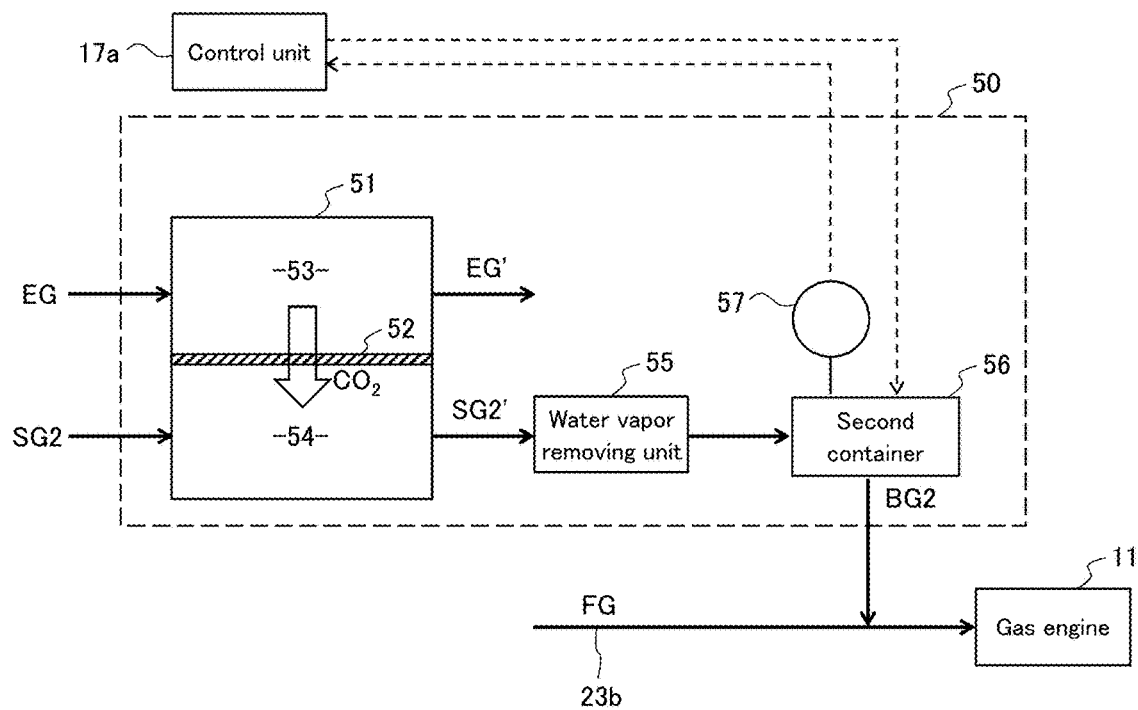
FIG. 14 is a block diagram schematically showing a configuration example of the second gas supply device according to the second embodiment.

As shown in FIG. 14, the second gas supply device 50 is configured to store the second concentration adjustment gas BG2, which is generated in advance so that the carbon dioxide concentration is higher than the setting range Wco2 of the carbon dioxide concentration, the methane concentration is lower than the setting range Wch4 of the methane concentration, or both, depending on whether the target component gas is methane or carbon dioxide, in the second container 56 and to supply the second concentration adjustment gas BG2 in the second container 56 to the first exhaust pipe 23b in accordance with an instruction from the control unit 17a. When the carbon dioxide concentration or the methane concentration measured by the gas concentration sensor 14 or the like is lower than the setting range Wco2 or higher than the setting range Wch4, the control unit 17a instructs the second gas supply device 50 to supply the second concentration adjustment gas BG2 to the first exhaust pipe 23b at a flow rate required for the carbon dioxide concentration or the methane concentration to be within the setting range Wco2 or within the setting range Wch4. When the state in which the carbon dioxide concentration or the methane concentration is lower than the setting range Wco2 or higher than the setting range Wch4 is not resolved after the control to increase or decrease (in this case, decrease) the carbon dioxide removal rate of the $CO_2$ removal device 16 described in the first embodiment, the control unit 17a calculates the necessary flow rate as a flow rate necessary to bring the carbon dioxide concentration or the methane concentration after the control into the setting range Wco2 or the setting range Wch4 in consideration of the measurement result of the gas concentration sensor 14 and the above-mentioned operating conditions of the $CO_2$ removal device 16.

Further, the second gas supply device 50 comprises a $CO_2$ separation device 51 and a water vapor removing unit 55 which generate the second concentration adjustment gas BG2 in advance. Since the water vapor removing unit 55 having the same configuration as that of the water vapor removing unit 19 described in the first embodiment can be used, a repetitive description thereof will be omitted.

The $CO_2$ separation device 51 has the same configuration as the $CO_2$ removal device 16, and comprises a $CO_2$ separation membrane 52 of a $CO_2$ facilitated transport membrane, a first treatment chamber 53 and a second treatment chamber 54 separated by the $CO_2$ separation membrane 52. The mixed gas EG having an increased carbon dioxide concentration discharged from the second treatment chamber 22 of the $CO_2$ removal device 16 is supplied to the first treatment chamber 53. Since the mixed gas EG supplied to the first treatment chamber 53 contains the sweep gas SG supplied to the second treatment chamber 22 of the $CO_2$ removal device 16 and a part of the mixed gas MG (mainly carbon dioxide and water vapor, and a trace amount of methane) permeated from the first treatment chamber 21 to the second treatment chamber 22, the carbon dioxide in the mixed gas EG is selectively permeated to the second treatment chamber 54 and separated from the component gas (for example, an inert gas such as argon) of the sweep gas SG and a small amount of methane, and is discharged from the second treatment chamber 54 as a mixed gas SG2' together with the sweep gas SG2 supplied to the second treatment chamber 53. Since the mixed gas SG2' discharged from the second treatment chamber 54 contains carbon dioxide and water vapor, it is stored in the second container 56 as the second concentration adjustment gas BG2 after the water vapor is removed by the water vapor removing unit 55. In the $CO_2$ separation device 51, only steam (water vapor) is used as the sweep gas SG2 to prevent the inert gas or the like from mixing into the second concentration adjustment gas BG2 when an inert gas or the like other than steam is used. However, since only steam (water vapor) is used as the sweep gas SG2, the pressure in the second treatment chamber 54 needs to be controlled so as to be equal to or lower than the saturated water vapor pressure at the temperatures in the second treatment chamber 54. The water vapor of the sweep gas SG2 can be supplied from the water vapor supply unit 18. In addition, the water vapor removed by the water vapor removing unit 55 can be supplied to the water vapor supply unit 18 and reused.

Since the $CO_2/CH_4$ selectivity of the facilitated transport membrane used in the $CO_2$ removal devices 16 and 51 is, for example, 100 or more, the methane concentration of the mixed gas EG is extremely low, and the methane in the mixed gas EG having the low methane concentration passes through the $CO_2$ separation membrane 52 in extremely low amounts. Therefore, by setting the carbon dioxide removal rate of the $CO_2$ removal device 51 to be high in accordance with the setting range Wch4 and the setting range Wco2, the methane concentration of the mixed gas SG2' can be made lower than the setting range Wch4 by a predetermined value (for example, 5 to 10 vol %) or more, or the carbon dioxide concentration of the mixed gas SG2' can be made higher than the setting range Wco2 by a predetermined value (for example, 5 to 10 vol %) or more.

However, although the condition that the carbon dioxide concentration and the methane concentration of the second concentration adjustment gas BG2 stored in the second container 56 are higher than the setting range Wco2 by the predetermined value or more and lower than the setting range Wch4 by the predetermined value or more is satisfied, the actual concentrations of the second concentration adjustment gas BG2 is unknown, so that the second container 56 is provided with a gas concentration sensor 57 similar to the gas concentration sensor 14, and the measured values of the carbon dioxide concentration and the methane concentration of the second concentration adjustment gas BG2 are notified to the control unit 17a. Then, the control unit 17a calculates the necessary flow rate in consideration of the measurement result of the gas concentration sensor 57.

Figure 15:
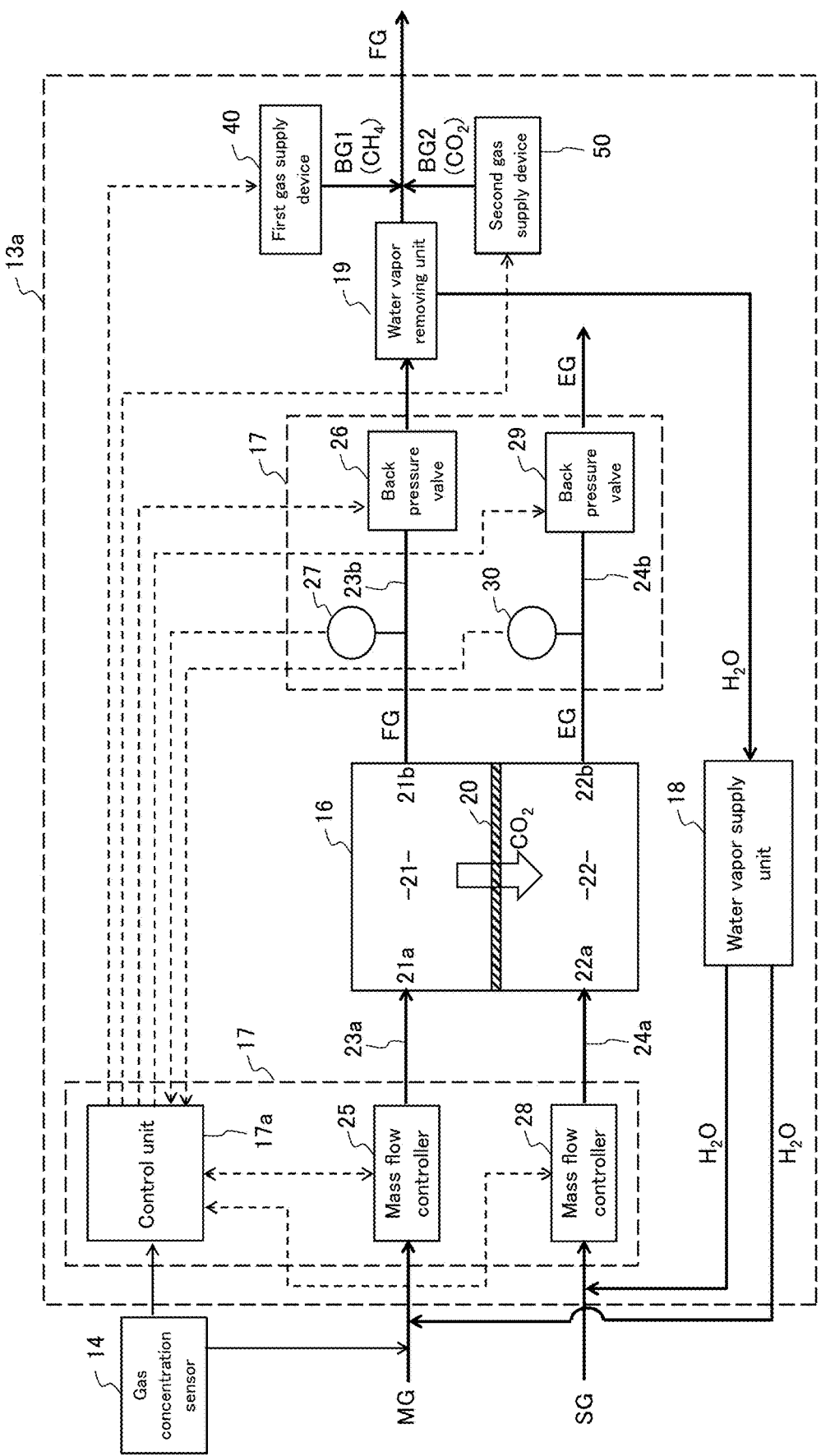
FIG. 15 is a block diagram schematically showing another configuration example of the fuel gas supply device and the operating condition control device according to the second embodiment.

In the above explanation, as shown in FIG. 12, the configuration in which the first gas supply device 40 supplies the first concentration adjustment gas BG1 and the second gas supply device 50 supplies the second concentration adjustment gas BG2 at the downstream side of the back pressure valve 26 and the upstream side of the water vapor removing unit 19 has been explained, but it is also preferable that the supply of the first concentration adjustment gas BG1 and the second concentration adjustment gas BG2 is performed at the downstream side of the water vapor removing unit 19 as shown in FIG. 15.

Figure 16:
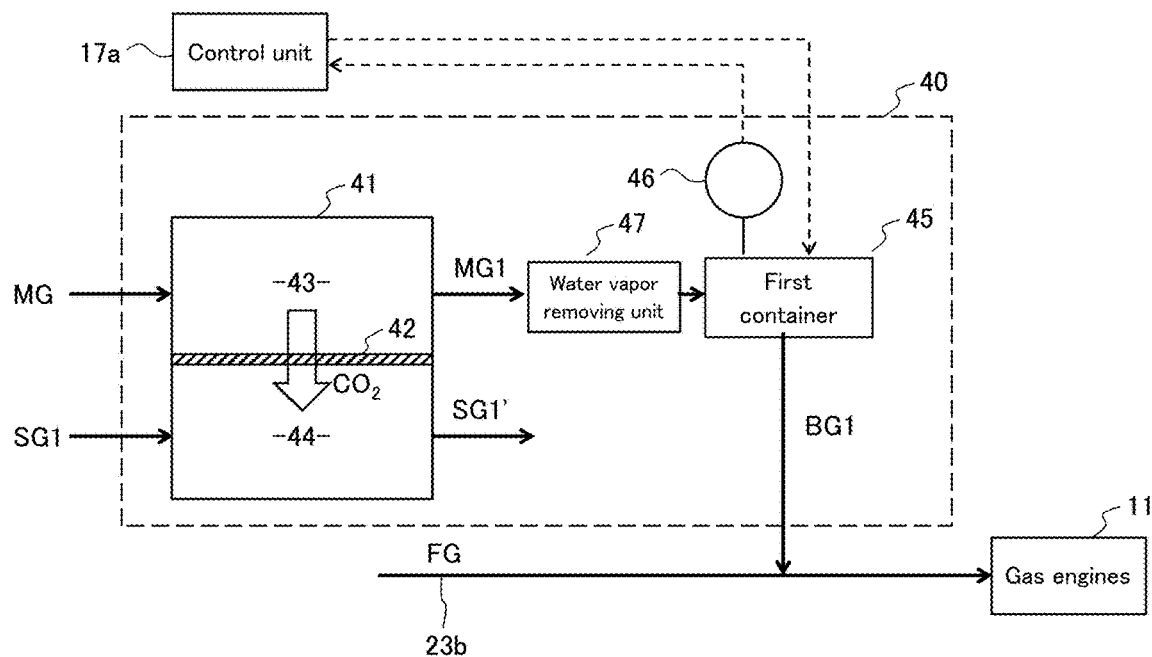
FIG. 16 is a block diagram schematically showing another configuration example of the first gas supply device according to the second embodiment.

Further, as shown in FIG. 16, it is preferable that the first gas supply device 40 has a configuration in which a water vapor removing unit 47 is interposed between the first treatment chamber 43 and the first container 45, and water vapor contained in the mixed gas MG1 discharged from the first treatment chamber 43 is removed by the water vapor removing unit 47.

In the above description, the configuration including both the first gas supply device 40 and the second gas supply device 50 has been described, but the configuration may include only one of them as necessary.

In the above explanation, the first gas supply device 40 is provided with the $CO_2$ separation device 41 to generate the first concentration adjustment gas BG1 in advance, but the first concentration adjustment gas BG1 may be a high-purity methane gas (natural gas or the like) supplied from the outside.

In the above explanation, the second gas supply device 50 comprises the $CO_2$ separation device 51, and the second concentration adjustment gas BG2 is generated in advance using the mixed gas EG having the increased carbon dioxide concentration discharged from the second treatment chamber 22 of the $CO_2$ removal device 16, however, instead of or in addition to the mixed gas EG, the exhaust gas containing carbon dioxide discharged from the gas engines may be supplied to the first treatment chamber 53 of the $CO_2$ separation device 51.

Third Embodiment

Next, a third embodiment of the present system will be described with reference to the drawings.

Figure 17:
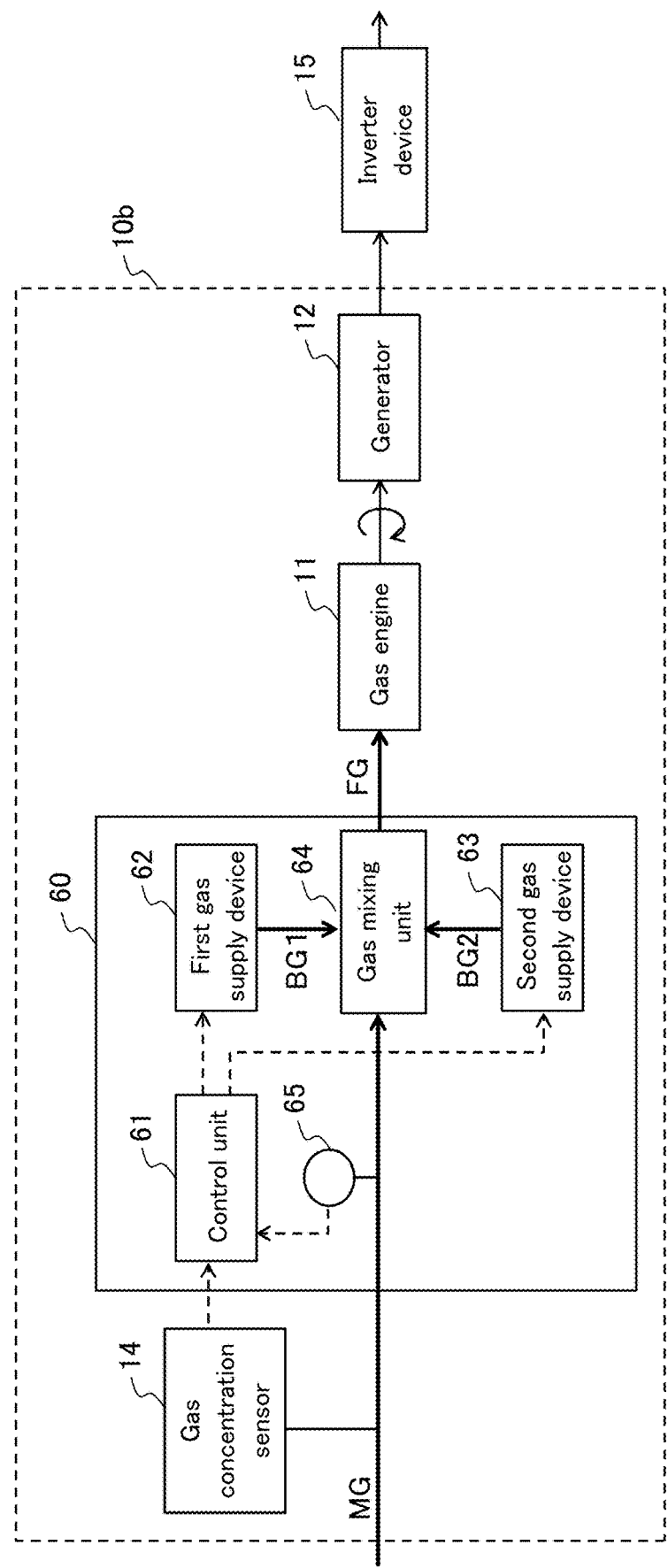
FIG. 17 is a block diagram schematically showing an example of a schematic configuration of a power generation system according to the third embodiment.

As shown in FIG. 17, the present system 10b according to the third embodiment comprises a gas engine 11, a generator 12, a fuel gas supply device 60, and a gas concentration sensor 14. The present system 10b differs from the present systems 10 and 10a of the first and second embodiments in that a fuel gas supply device 60 is provided in place of the fuel gas supply devices 13 and 13a of the present systems 10 and 10a. Since the gas engine 11, the generator 12, and the gas concentration sensor 14 of the present system 10b are the same as those of the first embodiment, the description thereof will not be repeated.

As shown in FIG. 17, the fuel gas supply device 60 comprises a control unit 61, a first gas supply device 62, a second gas supply device 63, and a gas mixing unit 64. The control unit 61 comprises a microcomputer, a programmable logic, or the like, similarly to the control unit 17a of the first and second embodiments. The first gas supply device 62 supplies the first concentration adjustment gas BG1 generated in advance to the gas mixing unit 64 in accordance with an instruction from the control unit 61. The second gas supply device 63 supplies the second concentration adjustment gas BG2 generated in advance to the gas mixing unit 64 in accordance with an instruction from the control unit 61. The gas mixing unit 64 is configured by, for example, a four-way valve or the like having three inlets and one outlet, and the mixed gas MG, the first concentration adjustment gas BG1, and the second concentration adjustment gas BG2 are separately supplied from each of the three inlets, and in the gas mixing unit 64, a mixed gas in which one of the first concentration adjustment gas BG1 and the second concentration adjustment gas BG2 is added to the mixed gas MG is supplied to the gas engine 11 as the fuel gas FG.

Similar to the first concentration adjustment gas BG1 described in the second embodiment, the first concentration adjustment gas BG1 is prepared so that the carbon dioxide concentration is lower than the setting range Wco2 of the carbon dioxide concentration, the methane concentration is higher than the setting range Wch4 of the methane concentration, or both, depending on whether the target component gas is methane or carbon dioxide. Like the second concentration adjustment gas BG2 described in the second embodiment, the second concentration adjustment gas BG2 is prepared so that the carbon dioxide concentration is higher than the setting range Wco2 of the carbon dioxide concentration, the methane concentration is lower than the setting range Wch4 of the methane concentration, or both, depending on whether the target component gas is methane or carbon dioxide.

The control unit 61 instructs one of the first gas supply device 62 and the second gas supply device 63 to supply one of the first concentration adjustment gas BG1 and the second concentration adjustment gas BG2 to the gas mixing unit 64 at a predetermined flow rate in accordance with the carbon dioxide concentration or the methane concentration measured by the gas concentration sensor 14 or the like. Specifically, when the carbon dioxide concentration or the methane concentration measured by the gas concentration sensor 14 or the like is higher than the setting range Wco2 or lower than the setting range Wch4, the control unit 61 instructs the first gas supply device 62 to supply the first concentration adjustment gas BG1 to the gas mixing unit 64 at a flow rate required for the carbon dioxide concentration or the methane concentration to be within the setting range Wco2 or within the setting range Wch4. The control unit 61 calculates the necessary flow rate as a flow rate necessary for the carbon dioxide concentration or the methane concentration of the mixed gas in which the first concentration adjustment gas BG1 is added to the mixed gas MG to be within the setting range Wco2 or within the setting range Wch4 in consideration of the measurement result of the gas concentration sensor 14 and the supply flow rate of the mixed gas MG and the like. Further, when the carbon dioxide concentration or the methane concentration measured by the gas concentration sensor 14 or the like is lower than the setting range Wco2 or higher than the setting range Wch4, the control unit 61 instructs the second gas supply device 63 to supply the second concentration adjustment gas BG2 to the gas mixing unit 64 at a flow rate required for the carbon dioxide concentration or the methane concentration to be within the setting range Wco2 or within the setting range Wch4. The control unit 61 calculates the necessary flow rate as a flow rate necessary for the carbon dioxide concentration or the methane concentration of the mixed gas in which the second concentration adjustment gas BG2 is added to the mixed gas MG to be within the setting range Wco2 or within the setting range Wch4 in consideration of the measurement result of the gas concentration sensor 14 and the supply flow rate of the mixed gas MG and the like. Therefore, in the present embodiment, a flow meter 65 such as a mass flow meter for measuring the supply flow rate of the mixed gas MG is provided.

Figure 18:
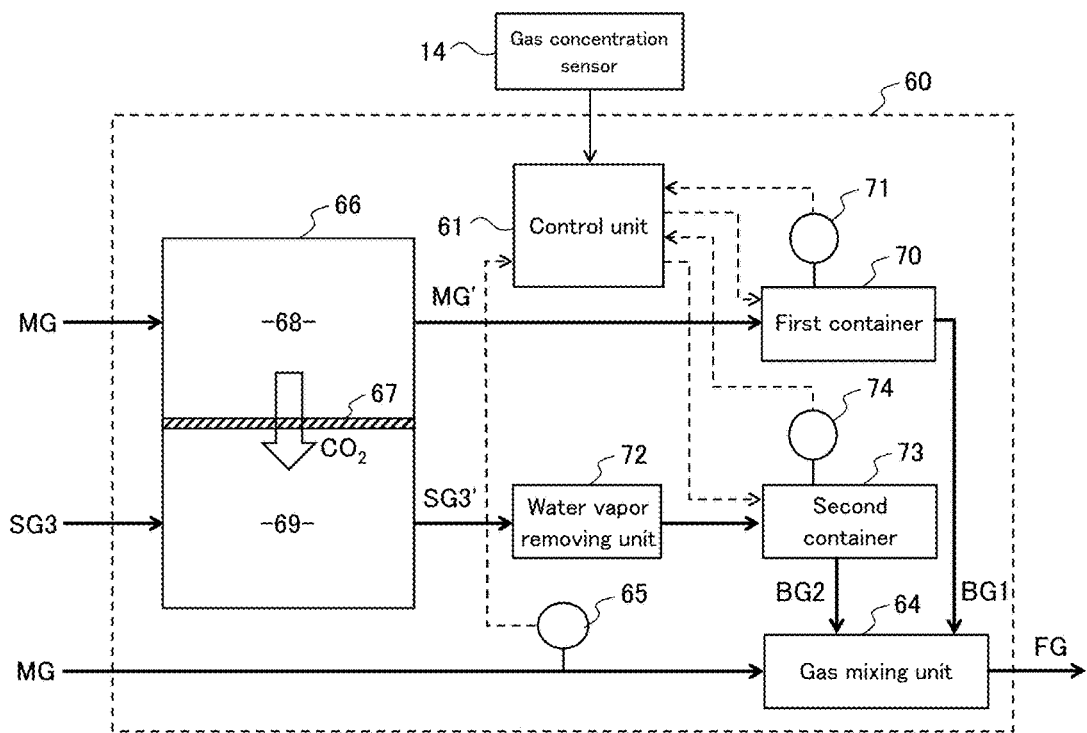
FIG. 18 is a block diagram schematically showing a configuration example of a fuel gas supply device according to the third embodiment.

Next, referring to FIG. 18, a configuration will be described in which the fuel gas supply device 60 generates the first concentration adjustment gas BG1 and the second concentration adjustment gas BG2 in advance using the mixed gas MG derived from the biogas which is the same as the mixed gas MG supplied to the gas mixing unit 64, and stores them in the first container 70 and the second container 73. The fuel gas supply device 60 includes a $CO_2$ separation device 66, a first container 70, a second container 73, and a water vapor removing unit 72 as the first gas supply device 62 and the second gas supply device 63. The first gas supply device 62 is composed of a $CO_2$ separation device 66 and a first container 70, the second gas supply device 63 is composed of a $CO_2$ separation device 66, a second container 73, and a water vapor removing unit 72, and the $CO_2$ separation device 66 is commonly used by the first gas supply device 62 and the second gas supply device 63.

The $CO_2$ separation device 66 has the same configuration as the $CO_2$ removal device 16 described in the first embodiment, and comprises a $CO_2$ separation membrane 67 of a $CO_2$ facilitated transport membrane, and a first treatment chamber 68 and a second treatment chamber 69 separated by the $CO_2$ separation membrane 67. The mixed gas MG derived from the biogas which is the same as the mixed gas MG supplied to the gas mixing unit 64 is supplied to the first treatment chamber 68 by using any of the various supply modes described in the first embodiment. Steam (water vapor) is supplied to the second treatment chamber 69 as a sweep gas SG3, and a mixed gas SG3' of a part of the mixed gas MG that has permeated from the first treatment chamber 68 to the second treatment chamber 69 and the sweep gas SG3 is discharged from the second treatment chamber 69. However, in the $CO_2$ separation device 66, since steam (water vapor) is used as the sweep gas SG3, the pressure in the second treatment chamber 69 needs to be controlled so as to be equal to or lower than the saturated water vapor pressure at the temperature in the second treatment chamber 69. The steam of the sweep gas SG3 can be supplied from the water vapor supply unit by providing the water vapor supply unit in the same manner as the water vapor supply unit 18 of the first embodiment. The water vapor removed by the water vapor removing unit 72 can be supplied to the water vapor supply unit and reused.

Carbon dioxide in the mixed gas MG supplied to the first treatment chamber 68 selectively permeates through the $CO_2$ separation membrane 67 of the $CO_2$ facilitated transport membrane toward the second treatment chamber 69, so that the mixed gas MG' whose carbon dioxide concentration is greatly lowered is discharged from the first treatment chamber 68 and stored in the first container 70 as the first concentration adjustment gas BG1. On the other hand, the sweep gas SG3 (steam) supplied to the second treatment chamber 69 and a part of the mixed gas MG (mainly carbon dioxide and water vapor, and a trace amount of methane) permeated from the first treatment chamber 68 are mixed in the second treatment chamber 69, discharged from the second treatment chamber 54 as a mixed gas SG3' having an extremely high carbon dioxide concentration, removed from the water vapor removing unit 72, and stored in the second container 73 as the second concentration adjustment gas BG2.

Since the $CO_2/CH_4$ selectivity of the facilitated transport membrane used in the $CO_2$ separation device 66 is, for example, 100 or more, an extremely high carbon dioxide removal rate can be realized by adjusting the operating condition of the $CO_2$ separation device 66. Therefore, by setting the carbon dioxide removal rate to be high in accordance with the setting range Wch4 and the setting range Wco2, the carbon dioxide concentration of the mixed gas MG' can be lower than the setting range Wco2 by a predetermined value (e.g., 5 to 10 vol %) or higher, or the methane concentration of the mixed gas MG' can be higher than the setting range Wch4 by a predetermined value (e.g., 5 to 10 vol %) or higher, and the methane concentration of the mixed gas SG3' can be lower than the setting range Wch4 by a predetermined value (e.g., 5 to 10 vol %) or higher, or the carbon dioxide concentration of the mixed gas SG3' can be higher than the setting range Wco2 by a predetermined value (e.g., 5 to 10 vol %) or higher.

The carbon dioxide concentration and the methane concentration of the mixed gas MG' and the mixed gas SG3' change with the change in the concentration of carbon dioxide and methane in the mixed gas MG supplied to the first treatment chamber 68. Therefore, the condition that the carbon dioxide concentration and the methane concentration of the first concentration adjustment gas BG1 stored in the first container 70 are lower than the setting range Wco2 by the predetermined value or more and higher than the setting range Wch4 by the predetermined value or more is satisfied, but the actual concentration is unknown, so that the first container 70 is provided with the gas concentration sensor 71 similar to the gas concentration sensor 14, and the measured values of the carbon dioxide concentration and the methane concentration of the first concentration adjustment gas BG1 are notified to the control unit 61. Then, the control unit 61 calculates the required flow rate of the first concentration adjustment gas BG1 in consideration of the measurement result of the gas concentration sensor 71. Similarly, the condition that the carbon dioxide concentration and the methane concentration of the second concentration adjustment gas BG2 stored in the second container 73 are higher than the setting range Wco2 by the predetermined value or more and lower than the setting range Wch4 by the predetermined value or more is satisfied, but the actual concentration thereof is unknown, so that the second container 73 is provided with a gas concentration sensor 74 similar to the gas concentration sensor 14, and the measured values of the carbon dioxide concentration and the methane concentration of the second concentration adjustment gas BG2 are notified to the control unit 61. Then, the control unit 61 calculates the required flow rate of the second concentration adjustment gas BG2 in consideration of the measurement result of the gas concentration sensor 74.

Other Embodiments

Next, a modification of the first to third embodiments (other embodiments) will be described.
(1) In the first to third embodiments described above, the configuration in which the $CO_2$ separation membrane 20, 42, 52, 67 of the $CO_2$ facilitated transport membrane is provided as the $CO_2$ removal device 16, 41, 51, 66 is assumed, but at least one of the $CO_2$ removal devices 16, 41, 51, 66 is not limited to this configuration, and may be, for example, a membrane separation type configuration in which a $CO_2$ separation membrane other than the $CO_2$ facilitated transport membrane is provided, a configuration in which a chemical absorption method is employed, a PSA device, a TSA device, or the like.

When a configuration employing a chemical absorption method is used as the $CO_2$ removal device 16, for example, an amount of absorption liquid, an amount of absorption liquid circulated, or the like can be used as the operating condition affecting an increase or decrease of the carbon dioxide removal rate. When the PSA device is used as the $CO_2$ removal device 16, for example, an amount of adsorbent, pressures, or the like can be used as the operating condition affecting the increase or decrease of the carbon dioxide removal rate. When the TSA device is used as the $CO_2$ removal device 16, for example, an amount of adsorbent, temperatures, or the like can be used as the operating condition affecting the increase or decrease of the carbon dioxide removal rate.

(2) In the first and second embodiments described above, the configuration in which steam (water vapor) is supplied from the water vapor supply unit 18 to the mixed gas MG has been described, but when water vapor is already contained in the mixed gas MG supplied to the fuel gas supply devices 13 and 13a, the supply of water vapor to the mixed gas MG in this configuration is not necessarily required.

(3) In the first to third embodiments described above, the sweep gas type configuration in which the $CO_2$ separation membranes 20, 42, 52, and 67 of the $CO_2$ facilitated transport membrane are provided as the $CO_2$ removal devices 16, 41, 51, and 66, and the sweep gases SG, SG1, SG2, and SG3 are supplied into the second treatment chambers 22, 44, 54, and 69 to generate a $CO_2$ partial pressure difference between the supply side and the permeate side of the $CO_2$ separation membranes 20, 42, 52, and 67 is assumed, but it is also possible to adopt an configuration by an operating type in which a $CO_2$ partial pressure difference is generated between the supply side and the permeate side of the $CO_2$ separation membranes 20, 42, 52, and 67 by pressurizing the first treatment chambers 21, 43, 53, 68 or depressurizing the second treatment chambers 22, 44, 54 and 69 of the $CO_2$ separation membranes 20, 42, 52, 67 without supplying the sweep gases SG, SG1, SG2, and SG3 into the second treatment chambers 22, 44, 54, and 69 in at least one of the $CO_2$ removal devices 16, 41, 51, and 66. In the case of the depressurization type configuration in which the inside of the second treatment chamber 22, 44, 54, 69 is depressurized, it is preferable to install a vacuum pump on the downstream side of the second treatment chamber 22, 44, 54, and 69.

At least one of the $CO_2$ removal devices 16, 41, 51, and 66 may be configured by combining the sweep gas type configuration and the pressurization or depressurization type configuration. When the sweep gas type configuration is not used as the $CO_2$ removal device 16 and the pressurization or depressurization type configuration is adopted, the flow rate of the sweep gas SG (sweep gas flow rate Fs) is not included in the above-mentioned operating condition candidates to be controlled.

(4) In the first to third embodiments described above, it is assumed that a mixed gas derived from a biogas obtained by methane fermentation of an organic substance is used as the mixed gas MG, but the mixed gas is not necessarily limited to a mixed gas derived from a biogas. When a mixed gas containing methane and carbon dioxide as a main component is used and the methane concentration or the carbon dioxide concentration or both can vary depending on the production conditions of the mixed gas or the like, it is possible to suppress the concentration variation by using the present systems 10, 10a, and 10b even if the mixed gas MG is not derived from biogas.

(5) In the second embodiment described above, the first gas supply device 40 and the second gas supply device 50 are respectively provided with the $CO_2$ separation device 41 and the $CO_2$ separation device 51 in order to generate the first concentration adjustment gas BG1 and the second concentration adjustment gas BG2 in advance. However, when both the first gas supply device 40 and the second gas supply device 50 are provided, the $CO_2$ separation device 41 and the $CO_2$ separation device 51 are not necessarily provided separately. For example, as described with reference to FIG. 18 in the third embodiment, the first gas supply device 40 and the second gas supply device 50 may be configured to include one $CO_2$ separation device.

INDUSTRIAL APPLICABILITY

The power generation system of the present invention can be used in a power generation system including a gas engine which generates kinetic energy by consuming a fuel gas containing methane as a main component and carbon dioxide.

DESCRIPTION OF SYMBOLS 10, 10a, 10b: Power generation system
11: Gas engine
12: Generator
13, 13a, 60: Fuel gas supply device
14, 46, 57, 71, 74: Gas concentration sensor
15: Inverter device
16, 41, 51, 66: $CO_2$ removal device
17: Operating condition control device
17a, 61: Control unit
18: Water vapor supply unit
18a: Water vapor separation unit
19, 47, 55, 72: Water vapor removing unit
20, 42, 52, 67: $CO_2$ separation membrane ($CO_2$ facilitated transport membrane)
21, 43, 53, 68: First treatment chamber
21a: First inlet
21b: First outlet
22, 44, 54, 69: Second treatment chamber
22a: Second inlet
22b: Second outlet
23a: First supply pipe
23b: First exhaust pipe
24a: Second supply pipe
24b: Second exhaust pipe
25, 28: Mass flow controller
26, 29: Back pressure valve
27, 30: Pressure gauge
31: Flow rate adjusting device
32: Pressure adjusting device
40, 62: First gas supply device
45, 70: First container
50, 63: Second gas supply device
56, 73: Second container
64: Gas mixing unit
65: Flow meter
EG, EG': Mixed gas
FG: Fuel gas
MG, MG', MG1: Mixed gas
SG, SG1, SG2, SG3: Sweep gas
SG1', SG2', SG3': Mixed gas

The invention claimed is:

1. A power generation system comprising: a gas engine for generating kinetic energy by consuming a fuel gas containing methane as a main component and carbon dioxide; and a generator for generating electricity by being driven by the kinetic energy generated by the gas engine,
wherein the power generation system further comprises:
a fuel gas supply device for controlling a concentration of target component gas which is at least one of methane and carbon dioxide in a mixed gas supplied from outside within a setting range with respect to the concentration of the target component gas in the fuel gas to the gas engine, and then supplying the mixed gas to the gas engine as the fuel gas; and
a gas concentration sensor for measuring at least one of carbon dioxide concentration and methane concentration in the mixed gas,
wherein, the fuel gas supply device is provided with a carbon dioxide removal device for removing carbon dioxide in the mixed gas, and an operating condition control device for controlling an operating condition that affects an increase or decrease of a carbon dioxide removal rate of the carbon dioxide removal device,
wherein the gas concentration sensor is disposed in at least one of a front stage and a rear stage of the carbon dioxide removal device, and
wherein the operating condition control device controls the operating condition of the carbon dioxide removal device based on the measurement result of the gas concentration sensor, thereby controlling the concentration of methane and carbon dioxide in the mixed gas.

2. The power generation system according to claim 1,
wherein the carbon dioxide removal device comprises a carbon dioxide separation membrane for selectively separating carbon dioxide contained in the mixed gas from methane, and a first treatment chamber and a second treatment chamber separated by the carbon dioxide separation membrane,
wherein the first treatment chamber is provided with a first inlet for receiving the mixed gas into the first treatment chamber and a first outlet for discharging the mixed gas whose concentration of the target component gas is controlled in the first treatment chamber as the fuel gas,
wherein the second treatment chamber is provided with a second outlet for discharging the gas permeated from the first treatment chamber into the second treatment chamber through the carbon dioxide separation membrane, and
wherein the operating condition control device controls at least one of operating condition candidates to be controlled including a flow rate of the mixed gas supplied into the first treatment chamber, a pressure in the first treatment chamber, a pressure in the second treatment chamber, an ambient temperature of the carbon dioxide separation membrane, and a membrane area of the carbon dioxide separation membrane, as the operating condition affecting the increase or decrease of the carbon dioxide removal rate of the carbon dioxide separation membrane, based on the measurement result of the gas concentration sensor.

3. The power generation system according to claim 2, wherein
the second treatment chamber has a second inlet for receiving a sweep gas into the second treatment chamber, the gas permeated from the first treatment chamber into the second treatment chamber through the carbon dioxide separation membrane and the sweep gas are discharged from the second outlet, and the flow rate of the sweep gas supplied into the second treatment chamber is included in the operating condition candidates to be controlled.

4. The power generation system according to claim 3, wherein
the carbon dioxide separation membrane is a facilitated transport membrane to which a carbon dioxide carrier that selectively reacts with carbon dioxide without reacting with methane is added, and at least one operating condition that affects an increase or decrease of at least one of the relative humidity in the first treatment chamber and the relative humidity in the second treatment chamber is included in the operating condition candidates to be controlled.

5. The power generation system according to claim 4, wherein
at least one of the mixed gas supplied into the first treatment chamber and the sweep gas supplied into the second treatment chamber contains water vapor.

6. The power generation system according to claim 4, further comprising a water vapor supply unit for supplying water vapor to at least one of the mixed gas to be supplied into the first treatment chamber and the sweep gas to be supplied into the second treatment chamber.

7. The power generation system according to claim 6, wherein
the operating condition control device controls the amount of water vapor added from the water vapor supply unit to the mixed gas as one of the operating condition candidates to be controlled when the water vapor supply unit supplies the water vapor to the mixed gas, and
the operating condition control device controls the amount of water vapor added from the water vapor supply unit to the sweep gas as one of the operating condition candidates to be controlled when the water vapor supply unit supplies the water vapor to the sweep gas.

8. The power generation system according to claim 2, wherein
the carbon dioxide separation membrane is a facilitated transport membrane to which a carbon dioxide carrier that selectively reacts with carbon dioxide without reacting with methane is added, and at least one operating condition that affects an increase or decrease of at least one of the relative humidity in the first treatment chamber and the relative humidity in the second treatment chamber is included in the operating condition candidates to be controlled.

9. The power generation system according to claim 8, wherein
the mixed gas supplied into the first treatment chamber contains water vapor.

10. The power generation system according to claim 8, further comprising a water vapor supply unit for supplying water vapor to the mixed gas to be supplied into the first treatment chamber.

11. The power generation system according to claim 10, wherein
the water vapor supply unit supplies water vapor generated by heating water by heat exchange with a high-temperature exhaust gas discharged from the gas engine to the mixed gas.

12. The power generation system according to claim 10, wherein
the water vapor supply unit supplies water vapor included in the exhaust gas discharged from the gas engine to the mixed gas.

13. The power generation system according to claim 10, wherein
the operating condition control device controls the amount of water vapor added from the water vapor supply unit to the mixed gas as one of the operating condition candidates to be controlled.

14. The power generation system according to claim 8, further comprising a desulfurization device using an ultra-high desulfurization catalyst for removing a sulfur component contained in the mixed gas in the upstream side of the fuel gas supply device, wherein the mixed gas includes a gas derived from a biogas produced by methane fermentation of an organic substance.

15. The power generation system according to claim 1, wherein
the fuel gas supply device comprises a first gas supply device for supplying a first concentration adjustment gas containing methane as a main component, which has a concentration of the target component gas lower than the setting range when the target component gas is carbon dioxide or a concentration of the target component gas higher than the setting range when the target component gas is methane, to the mixed gas, and
the first gas supply device supplies the first concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is higher than the setting range, or when the target component gas is methane and the concentration of the target component gas of the mixed gas is lower than the setting range.

16. The power generation system according to claim 15, wherein
the first gas supply device comprises a second carbon dioxide removal device for selectively separating carbon dioxide contained in the mixed gas with respect to methane, and a first container for storing the first concentration adjustment gas prepared in advance by separating carbon dioxide from the mixed gas using the second carbon dioxide removal device.

17. The power generation system according to claim 1, wherein
the fuel gas supply device comprises a second gas supply device for supplying a second concentration adjustment gas containing carbon dioxide or methane and carbon dioxide as a main component, which has a concentration of the target component gas higher than the setting range when the target component gas is carbon dioxide or a concentration of the target component gas lower than the setting range when the target component gas is methane, to the mixed gas, and
the second gas supply device supplies the second concentration adjustment gas to the mixed gas based on the measurement result of the gas concentration sensor when the target component gas is carbon dioxide and the concentration of the target component gas of the mixed gas is lower than the setting range, or when the target component gas is methane and the concentration of the target component gas of the mixed gas is higher than the setting range.

18. The power generation system according to claim 17, wherein
the second gas supply device comprises a second container for storing the second concentration adjustment gas, and
the second concentration adjustment gas includes carbon dioxide removed from the mixed gas by the carbon dioxide removal device.

19. The power generation system according to claim 1, wherein the mixed gas includes a gas derived from a biogas produced by methane fermentation of an organic substance.

20. A power generation system comprising: a gas engine for generating kinetic energy by consuming a fuel gas containing methane as a main component and carbon dioxide; and a generator for generating electricity by being driven by the kinetic energy generated by the gas engine,
wherein the power generation system further comprises:
a fuel gas supply device for controlling a concentration of target component gas which is at least one of methane and carbon dioxide in a mixed gas supplied from outside within a setting range with respect to the concentration of the target component gas in the fuel gas to the gas engine, and then supplying the mixed gas to the gas engine as the fuel gas; and
a gas concentration sensor for measuring at least one of carbon dioxide concentration and methane concentration in the mixed gas,
wherein the fuel gas supply device comprises:
a first gas supply device for supplying a first concentration adjustment gas containing methane as a main component, which has a concentration of the target component gas lower than the setting range when the target component gas is carbon dioxide or a concentration of the target component gas higher than the setting range when the target component gas is methane, to the mixed gas; and
a second gas supply device for supplying a second concentration adjustment gas containing carbon dioxide or methane and carbon dioxide as a main component, which has a concentration of the target component gas higher than the setting range when the target component gas is carbon dioxide or a concentration of the target component gas lower than the setting range when the target component gas is methane, to the mixed gas,
wherein the first gas supply device supplies the first concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is higher than the setting range, or when the target component gas is methane and the concentration of the target component gas of the mixed gas is lower than the setting range,
wherein the second gas supply device supplies the second concentration adjustment gas to the mixed gas to control the concentration of methane and carbon dioxide in the mixed gas based on the measurement result of the gas concentration sensor when the target component gas is carbon dioxide and the concentration of the target component gas of the mixed gas is lower than the setting range, or when the target component gas is methane and the concentration of the target component gas of the mixed gas is higher than the setting range, and
wherein the fuel gas supply device comprises a carbon dioxide removal device for selectively separating carbon dioxide contained in the mixed gas with respect to methane, and first and second containers for separately storing the first concentration adjustment gas and the second concentration adjustment gas prepared in advance by separating carbon dioxide from the mixed gas using the carbon dioxide removal device.

* * * * *